United States Patent
Rivas et al.

(10) Patent No.: US 11,120,086 B2
(45) Date of Patent: Sep. 14, 2021

(54) TOPONYM DISAMBIGUATION

(71) Applicant: Oracle International Corporation, Redwood Shores, CA (US)

(72) Inventors: Luis E. Rivas, Denver, CO (US); Michael Malak, Denver, CO (US); Mark L. Kreider, Arvada, CO (US)

(73) Assignee: Oracle International Corporation, Redwood Shore, CA (US)

( * ) Notice: Subject to any disclaimer, the term of this patent is extended or adjusted under 35 U.S.C. 154(b) by 299 days.

(21) Appl. No.: 16/272,831

(22) Filed: Feb. 11, 2019

(65) Prior Publication Data

US 2019/0251122 A1 Aug. 15, 2019

Related U.S. Application Data

(60) Provisional application No. 62/629,891, filed on Feb. 13, 2018, provisional application No. 62/675,889, filed on May 24, 2018.

(51) Int. Cl.
*G06F 16/909* (2019.01)
*G06F 16/906* (2019.01)
*G06F 16/2457* (2019.01)
*G06F 40/18* (2020.01)

(52) U.S. Cl.
CPC ...... *G06F 16/909* (2019.01); *G06F 16/24578* (2019.01); *G06F 16/906* (2019.01); *G06F 40/18* (2020.01)

(58) Field of Classification Search
CPC . G06F 16/909; G06F 16/906; G06F 16/24578

USPC .......................................................... 707/748
See application file for complete search history.

(56) References Cited

U.S. PATENT DOCUMENTS

| | | | |
|---|---|---|---|
| 8,200,676 B2 * | 6/2012 | Frank | G06F 16/29 707/749 |
| 8,594,996 B2 | 11/2013 | Liang et al. | |
| 9,424,529 B2 | 8/2016 | Agrawal et al. | |
| 9,747,278 B2 | 8/2017 | Bier et al. | |
| 2010/0179754 A1 | 7/2010 | Faenger et al. | |
| 2013/0191385 A1 | 7/2013 | Vespe et al. | |
| 2016/0092557 A1 | 3/2016 | Stojanovic et al. | |

OTHER PUBLICATIONS

U.S. Appl. No. 16/141,244, Data Standardization Techniques filed Sep. 25, 2018, 75 pages.

(Continued)

*Primary Examiner* — Shahid A Alam
(74) *Attorney, Agent, or Firm* — Kilpatrick Townsend & Stockton LLP

(57) ABSTRACT

Techniques are disclosed for toponym disambiguation. Toponym disambiguation can be performed for a set of geographic location data, such as placenames. A subset of the data and additional location information associated with the subset of the data can be initially determined. The remaining geographic location data in the set of geographic location data can be scored in order to determined additional location information for the remaining geographic location data. Additional location information for the remaining geographic location data can be determined based on calculated scores.

20 Claims, 19 Drawing Sheets

(56) References Cited

OTHER PUBLICATIONS

U.S. Appl. No. 16/237,405, Techniques for Similarity Analysis and Data Enrichment Using Knowledge Sources filed Dec. 31, 2018, 110 pages.
Garbin et al., Disambiguating Toponyms in News, Proceedings of the conference on Human Language Technology and Empirical Methods in Natural Language Processing, Available Online at: https://aclanthology.info/pdf/H/H05/H05-1046.pdf, Oct. 2005, pp. 363-370.
Kamalloo et al., A Coherent Unsupervised Model for Toponym Resolution, Available Online at: https://arxiv.org/pdf/1805.01952.pdf, Apr. 23-27, 2018, 10 pages.
Roberts et al., Toponym Disambiguation Using Events, Available Online at: https://pdfs.semanticscholar.org/c0bb/b8a70eaf074aa02f88d8372aa76a8febf3ab.pdf, Jan. 2010, pp. 271-276.
Buscaldi, Toponym Disambiguation in Natural Language Processing, Available Online at: https://pdfs.semanticscholar.org/6b2b/cfa7bcccdaa4276d6aa91bcd3bc27404dcdd.pdf, Jul. 2010, 199 pages.
Spitz et al., So Far Away and Yet so Close: Augmenting Toponym Disambiguation and Similarity with Text-Based Networks, Available Online at: https://dbs.ifi.uni-heidelberg.de/files/Team/aspitz/publications/Spitz_et_al_2016_So_Far_Away_and_yet_so_Close.pdf, Jun. 26-Jul. 1, 2016, 6 pages.
Volz et al., Towards Ontology-Based Disambiguation of Geographical Identifiers, Available Online at: https://www2007.org/workshops/paper_132.pdf, May 8-12, 2007, 7 pages.
Rauch et al., A confidence-based framework for disambiguating geographic terms, HLT-NAACL-GEOREF '03 Proceedings of the HLT-NAACL, workshop on Analysis of geographic references, vol. 1, 2003, 5 pages.
Batista et al., Toponym Disambiguation using Ontology-based Semantic Similarity, Computational Processing of the Portuguese Language, vol. 7243, 2012, 6 pages.

\* cited by examiner

Example X:

| City |
|---|
| Cambridge |
| Springfield |
| Reston |

Example R:

| City | Latitude | Longitude | Country | Province | Population | IsPreferredSpelling |
|---|---|---|---|---|---|---|
| Cambridge | 52.2 | 0.11667 | United Kingdom | England | 128488 | Y |
| Cambridge | 42.3751 | -71.10561 | United States | Massachusetts | 110402 | Y |
| Cambridge | 43.3601 | -80.31269 | Canada | Ontario | 120372 | Y |
| Springfield | 39.80172 | -89.64371 | United States | Illinois | 116565 | Y |
| Springfield | 38.78928 | -77.1872 | United States | Virginia | 30484 | Y |
| Reston | 38.96872 | 38.96872 | United States | Virginia | 58404 | Y |
| Sioux City | 42.5 | -96.4 | United States | Iowa | 82821 | Y |
| Cairo | 30.06263 | 31.24967 | Egypt | Cairo | 7734614 | Y |

Resulting R_X:

| City | Latitude | Longitude | Country | Province | Population | IsPreferredSpelling |
|---|---|---|---|---|---|---|
| Cambridge | 52.2 | 0.11667 | United Kingdom | England | 128488 | Y |
| Cambridge | 42.3751 | -71.10561 | United States | Massachusetts | 110402 | Y |
| Cambridge | 43.3601 | -80.31269 | Canada | Ontario | 120372 | Y |
| Springfield | 39.80172 | -89.64371 | United States | Illinois | 116565 | Y |
| Springfield | 38.78928 | -77.1872 | United States | Virginia | 30484 | Y |
| Reston | 38.96872 | 38.96872 | United States | Virginia | 58404 | Y |
| Sioux City | 42.5 | -96.4 | United States | Iowa | 82821 | Y |

Example R stored as a hash table:

| | | |
|---|---|---|
| CAMBRIDGE | (England, United Kingdom, 52.2, 42.3751, 122488, Y) | (Massachusetts, United States, 42.3751, -71.10561, 110422, Y) | (Ontario, Canada, 43.3801, -80.31269, 120372, Y) |
| SPRINGFIELD | (Illinois, United States, 39.80172, -89.64371, Y) | (Virginia, United States, 38.78028, -77.1872, 30494, Y) | |
| RESTON | (Virginia, United States, 38.96572, 38.96972, Y) | | |
| SIOUX CITY | (Iowa, United States, 42.5, -96.4, Y) | | |
| CAIRO | (Cairo, Egypt, 30.08263, 31.24967, Y) | | |

Example Rx stored as a hash table:

| | | |
|---|---|---|
| CAMBRIDGE | (England, United Kingdom, 52.2, 42.3751, 122488, Y) | (Massachusetts, United States, 42.3751, -71.10561, 110422, Y) | (Ontario, Canada, 43.3801, -80.31269, 120372, Y) |
| SPRINGFIELD | (Illinois, United States, 39.80172, -89.64371, Y) | (Virginia, United States, 38.78029, -77.1872, 30494, Y) | |
| RESTON | (Virginia, United States, 38.96572, 38.96972, Y) | | |
| SIOUX CITY | (Iowa, United States, 42.5, -96.4, Y) | | |

Resulting C:

| City | Province |
|---|---|
| <empty> | <empty> |

*FIG. 3*

Resulting C:

| City | Province |
|---|---|
| Reston | Virginia |
| Sioux City | Iowa |

*FIG. 4A*  ← 400

Resulting $R_X$:

| City | Latitude | Longitude | Country | Province | Population | IsPreferredSpelling |
|---|---|---|---|---|---|---|
| Cambridge | 52.2 | 0.11667 | United Kingdom | England | 128488 | Y |
| Cambridge | 42.3751 | -71.10561 | United States | Massachusetts | 110402 | Y |
| Cambridge | 43.3601 | -80.31269 | Canada | Ontario | 120372 | Y |
| Springfield | 39.80172 | -89.64371 | United States | Illinois | 116565 | Y |
| Springfield | 38.78928 | -77.1872 | United States | Virginia | 30484 | Y |

*FIG. 4B*  ← 410

Resulting R_X stored in a hash table:

| CAMBRIDGE | (England, United Kingdom, 52.2, 43.3751, 126498, Y) | (Massachusetts, United States, 42.3751, -72.10561, 110422, Y) | (Ontario, Canada, 43.3603, -80.31269, 120372, Y) |
| SPRINGFIELD | (Illinois, United States, 39.8017, -89.64371, Y) | (Virginia, United States, 38.78936, -77.1872, 30484, Y) | |

| City | Province |
|---|---|
| Reston | Virginia |
| Sioux City | Iowa |
| Cambridge | Ontario |
| Springfield | Virginia |

Resulting S

| u (unassigned city) | p (potential province) | a (assigned city) | score |
|---|---|---|---|
| Cambridge | England | Reston | 0.1 |
| Cambridge | England | Sioux City | 0.2 |
| Cambridge | Massachusetts | Reston | 0.3 |
| Cambridge | Massachusetts | Sioux City | 0.4 |
| Cambridge | Ontario | Reston | 0.5 |
| Cambridge | Ontario | Sioux City | 0.6 |
| Springfield | Illinois | Reston | 0.7 |
| Springfield | Illinois | Sioux City | 0.8 |
| Springfield | Virginia | Reston | 0.9 |
| Springfield | Virginia | Sioux City | 0.91 |

*FIG. 7A*

S reformatted into list-style with each list sorted by descending score:

| Cambridge | <Ontario,0.6>,<Ontario,0.5>,<Massachusetts,0.4>,<Massachusetts,0.3>,<England,0.2>,<England,0.1> |
|---|---|
| Springfield | <Virginia,0.91>,<Virginia,0.9>,<Illinois,0.8>,<Illinois,0.7> |

*FIG. 7B*

S with each list truncated to winner and runner-up:

| Cambridge | <Ontario,0.6>,<Ontario,0.5> |
|---|---|
| Springfield | <Virginia,0.91>,<Virginia,0.9> |

*FIG. 7C*

Resulting S':

| City | score' |
|---|---|
| Cambridge | 1.225 |
| Springfield | 0.9725 |

*FIG. 7D*

Resulting C:

| City | Province |
|---|---|
| Reston | Virginia |
| Sioux City | Iowa |
| Cambridge | Ontario |

Resulting R_X:

| City | Latitude | Longitude | Country | Province | Population | IsPreferredSpelling |
|---|---|---|---|---|---|---|
| Springfield | 39.80172 | -89.64371 | United States | Illinois | 116565 | Y |
| Springfield | 38.78928 | -77.1872 | United States | Virginia | 30484 | Y |

| | | |
|---|---|---|
| Cambridge, England | (Reston, 0.1) | (Sioux City, 0.2) |
| Cambridge, Massachusetts | (Reston, 0.3) | (Sioux City, 0.4) |
| Cambridge, Ontario | (Reston, 0.5) | (Sioux City, 0.6) |
| Springfield, Illinois | (Reston, 0.7) | (Sioux City, 0.8) |
| Springfield, Virginia | (Reston, 0.9) | (Sioux City, 0.91) |

TOPONYM DISAMBIGUATION

CROSS-REFERENCE TO RELATED APPLICATIONS

The present application is a non-provisional application of and claims priority to U.S. provisional application No. 62/629,891 filed on Feb. 13, 2018, and U.S. Provisional Application No. 62/675,889, filed on May 24, 2018, which are incorporated by reference herein in their entirety for all purposes.

BACKGROUND

Example embodiments are related to the field of data analytics, and specifically to toponym disambiguation. Example embodiments are directed to methods, devices, systems and computer readable media for determining location information based on received data.

Data, such as, a table from a spreadsheet, can include a column which is identified as being directed to a particular type of location. For example, the type of location may be identified as a city, or other types of locations such as a lake, train station, etc. If, for example, the column is identified as a city, there may not be another column in the spreadsheet that identifies the corresponding state, province, and/or country. Countries other than the United States may use province as opposed to a city. The column of information that is provided (e.g., city name) may not be as beneficial for, for example, data analysis without additional information that corresponds to the column of information. It can be difficult to identify a location if only city information is provided.

Therefore, it may be beneficial to provide additional location information based on given location information, such as a column of city information. Specifically, a name of a city such, as "Paris," could apply to several states in the United States and could also apply to other countries. Therefore, having a column of data which only identifies one piece of location information (e.g., city) may not be as beneficial when analyzing the data without additional information.

SUMMARY

Data can be stored in a spreadsheet which can be tabular in form. For example, a spreadsheet could have columns and rows. A particular column could correspond to a location, such as a city. This is merely an example and the column of information can correspond to geographical information other than a city. However, having only a piece of geographical information (e.g., city information) may not be as beneficial when analyzing the data without having additional information. That is, it would be beneficial to have additional information corresponding to the city such as state, province, and/or country.

Therefore, an example embodiment can infer additional information given a piece of geographic information. For example, given a piece of geographic information, such as a city name, additional geographic information can be inferred. Although a column of data is described in the example embodiments, the data can be obtained from a source other than a column of a spreadsheet. The geographic information can also be known as placenames. A placename can be a name of a geographic location such as a city, town, lake, range of hills, etc. An example embodiment can infer a state, province, or country corresponding to the city name. State, province, and country are examples, and other additional location related information can be obtained.

An example embodiment may refer to province, however, province can be a state or prefecture depending on the country that the city information applies. That is, the additional information that is obtained can vary per city, state, and/or country. An example embodiment can use a geographical reference, such as a geographical database, when performing the toponym disambiguation. A geographical database can include, for example GeoNames. A geographical database can include information about a particular location, such as a city. For example, a geographical database can contain information about a city such as city name, province, country, population, latitude, longitude, preferred spellings and abbreviations for a city.

Toponym can correspond to a name of a place or geographical location. Disambiguation can include removing uncertainty regarding a meaning of a word, phrase, or other linguistic unit. Therefore, an example embodiment can provide more certainty regarding location information, such as a name of a city.

In accordance with an example embodiment, a method for performing the disambiguation can start with locations that are the least ambiguous. For example, when a column of information corresponding to a city is received, disambiguation can initially be performed with the least ambiguous cities.

After additional geographic location information is identified for the least ambiguous cities, an example embodiment can identify additional geographical information for the cities in the column of information that are more ambiguous. The disambiguation can be performed by using one of or a combination of population, latitude, longitude, whether the country has been seen before, whether the match found in the geographical reference is indicated as a preferred spelling, and a confidence score regarding the additional information (e.g., state, province, country, etc.) to the particular location information (e.g., city). For example, it may be more likely that a particular location information (e.g., city) corresponds to a city in the United States as opposed to a city in another country.

In accordance with an example embodiment, processing and assigning additional geographic information to a particular column of data (e.g., city) can be based on confidence and/or a confidence score. By using confidence to determine additional information, heuristic information, such as distance and same country can be more effective and accurate.

In an example embodiment, completely unambiguous cities can be assigned additional geographic information (e.g., a state or province) first. After the completely unambiguous cities have been assigned additional geographic information (e.g., state, province, country), the highest confidence assignments can be disambiguated. After initial scoring, the scores can be further adjusted by how much ahead the highest score is for each city/province pair than the other provinces for that city. The example embodiments are described with respect to pairing a city and province, however, example embodiments would also applying to pairing a city and state and other types of location information pairings.

Further, an example embodiment can combine one or more types of heuristic information to determine the confidence scores. For example, heuristic information can include population information, distance information, same-country information, preferred spelling information, and how much farther ahead the "winning" match is from "runner-up" matches for the same city. A "winning match" can be a city and province pairing that has a higher confidence score than other city and province pairings for the same city.

Therefore, example embodiments can provide a clearer and fuller view of geographic information based on a piece geographic information. With such information, data analysis can be performed more effectively and accurately. For example, if data for a particular region is being analyzed, it can be easier to identify data relevant to that region.

The foregoing, together with other features and embodiments will become more apparent upon referring to the following specification, claims, and accompanying drawings.

BRIEF DESCRIPTION OF THE DRAWINGS

The disclosure will be readily understood by the following detailed description in conjunction with the accompanying drawings, wherein like reference numerals designate like elements, and in which:

FIG. 2B illustrates a reference list of cities, FIG. 2C illustrates a set of city names from the input column corresponding to the reference list of cities, FIG. 2D illustrates the reference list of cities stored in a hash table, and FIG. 2E illustrates a set of city names from the input column corresponding to the reference list of cities stored in a hash table, in accordance with some example embodiments.

FIG. 3 illustrates a set configured to store pairings, in accordance with some example embodiments.

FIG. 4A illustrates the set containing city and province pairings, FIG. 4B illustrates an updated set of city names corresponding to the reference list of cities, and FIG. 4C illustrates the updated set of city names corresponding to the reference list of cities stored in a hash table, in accordance with some example embodiments.

FIGS. 7A, 7B, 7C, 7D, 7G illustrates confidence scores for a set, FIG. 7E illustrates an updated data set, and FIG. 7F illustrates an updated set of city names, in accordance with some example embodiments.

DETAILED DESCRIPTION

Figure 1:
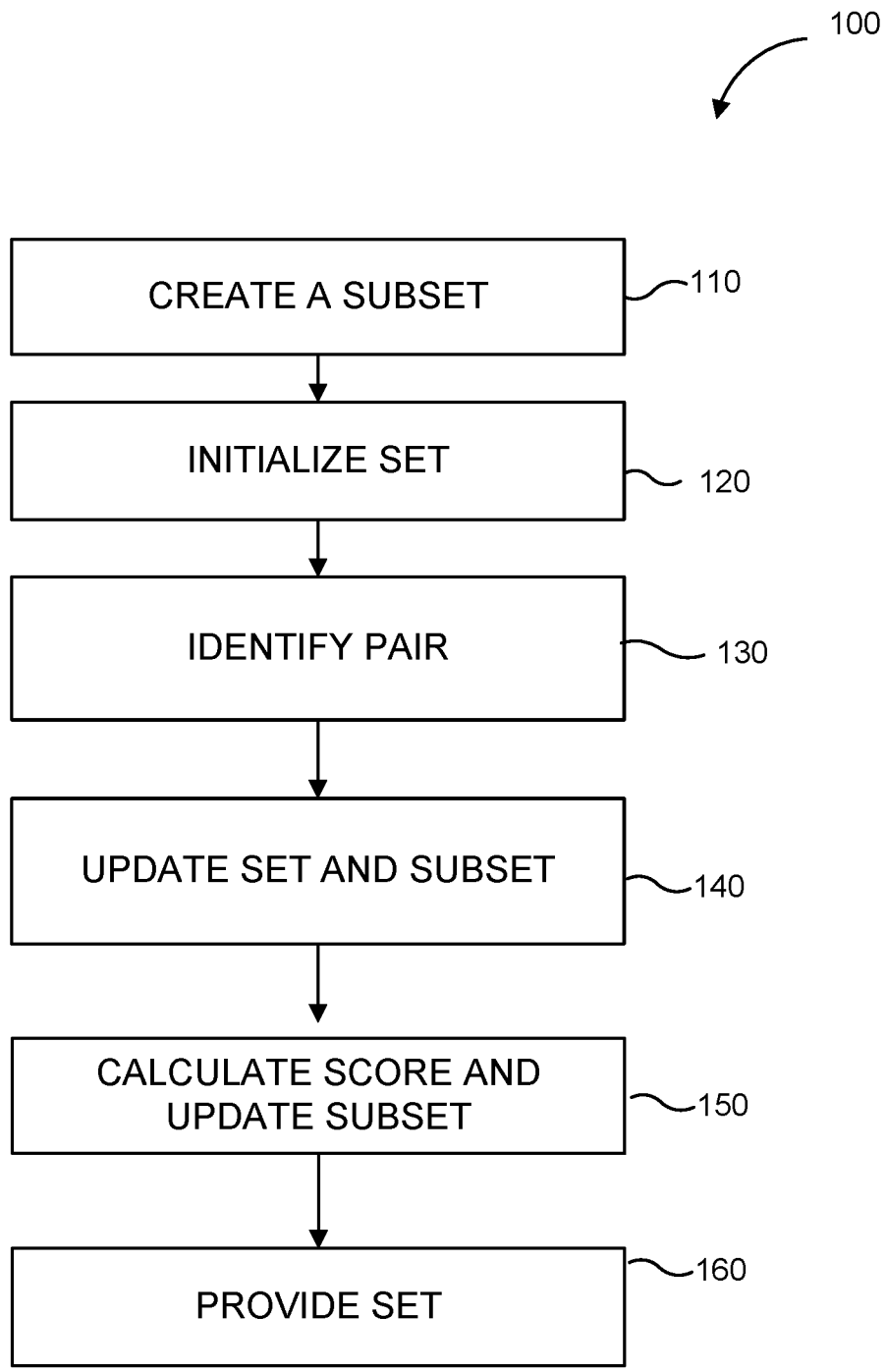
FIG. 1 illustrates a method of performing toponym disambiguation for data, in accordance with some example embodiments.

In the following description, for the purposes of explanation, specific details are set forth in order to provide a thorough understanding of example embodiments. However, it will be apparent that various embodiments may be practiced without these specific details. For example, systems, algorithms, structures, techniques, networks, processes, and other components may be shown as components in block diagram form in order not to obscure the embodiments in unnecessary detail. The figures and description are not intended to be restrictive.

A company may have various types of data about or from customers. For example, a company may have customer purchase information or customer address information. However, the data may be missing information or contain errors. There may be customer city information and there may not be customer country or state information. For example, the provided city information may be "London." However, the city of London can be in London, England or in London, Ontario in Canada. The data will not be as beneficial to a user since the user does not know whether, for example, a purchase was made in London, England or in London, Ontario. A user would not be able easily determine the geographic region to, for example, target for additional products and services. The data would be more beneficial if the information did not contain errors or if the data contained additional information.

Therefore, an example embodiment enriches data so that it will be more useful to a user, such as a company, and a user can make more informed decisions. For example, a company can more easily determine the cities and states that are purchasing a product or can determine a regions reviews of a product. By determining a state of a city additional information, such as population, demographics, etc., can be gathered. Further, visualizations of the data can be more easily created with enriched and cleansed data. Also, the cleansed and/or enriched data can also be used in predictive analysis and in creating data models.

Data cleansing or data cleaning can including detecting and correcting errors or inaccuracies in data. Data enrichment can include correcting typographical errors in data, adding missing information so as to make the data more useful. Specifically, it can be difficult to perform analysis on the data, if there is no consistency with the data. For example, if a database includes city information and the city if spelled differently in each database entry, it can be difficult to analyze the data correctly.

Data (e.g., Excel, JSON, XML data) can be ingested by the system, however, the data may have not have sufficient information for performing complete and thorough analysis of the data. For example, a column of data may include city information, but does not include additional information such as state, province, or country. The column of data can be generated from initial data, such as sales information, customer information, reviews, tweets, posts, user comments, etc. State, province and country are examples of location information, however, location information can includes other types of information, such as prefecture, and can vary according to country. Therefore, although the data includes some geographical information, the geographical information may not be complete and sufficient for a user to use.

A data enrichment system, according to an example embodiment can ingest the data and determine, for example, what additional information is needed. If ingested data includes city information and not state or country information, an example embodiment can determine state and country information based on the city information. An example embodiment in which location information is determined based on ambiguous location information can be called toponym disambiguation.

A toponym can be a name of a place, such as city, state, country, etc. The name of the place (e.g., city, state, country) can be based on a topographical feature. Disambiguation can include removing uncertainty from the name of the place. That is, more complete location information can be determined for a particular place and place information can be clarified.

The data enrichment system can be implemented as part of a big data preparation platform. Alternatively, the data enrichment system can be implemented as part of an analytics platform. There are merely examples, and some or all of the components of a data enrichment system can be implemented as part of other platforms that may require enriched data.

Therefore, an example embodiment performs toponym disambiguation on the particular geographical information so that additional geographical information can be obtained in order to create a more complete geographical picture. By having enriched data, deeper and richer data analytics can be performed.

Figure 8:
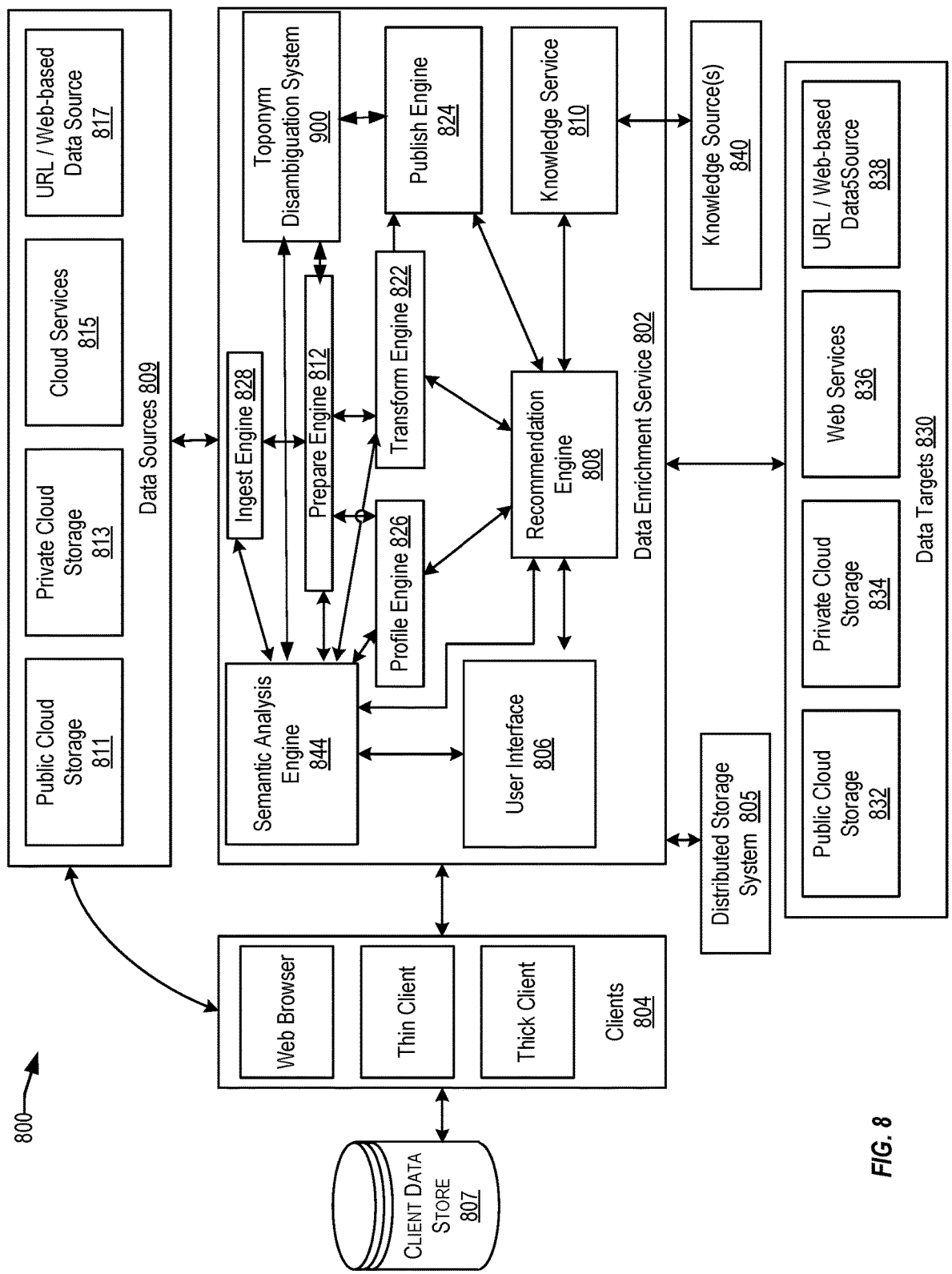
FIG. 8 illustrates a simplified block diagram of data enrichment system, in accordance with some example embodiments.
Figure 9:
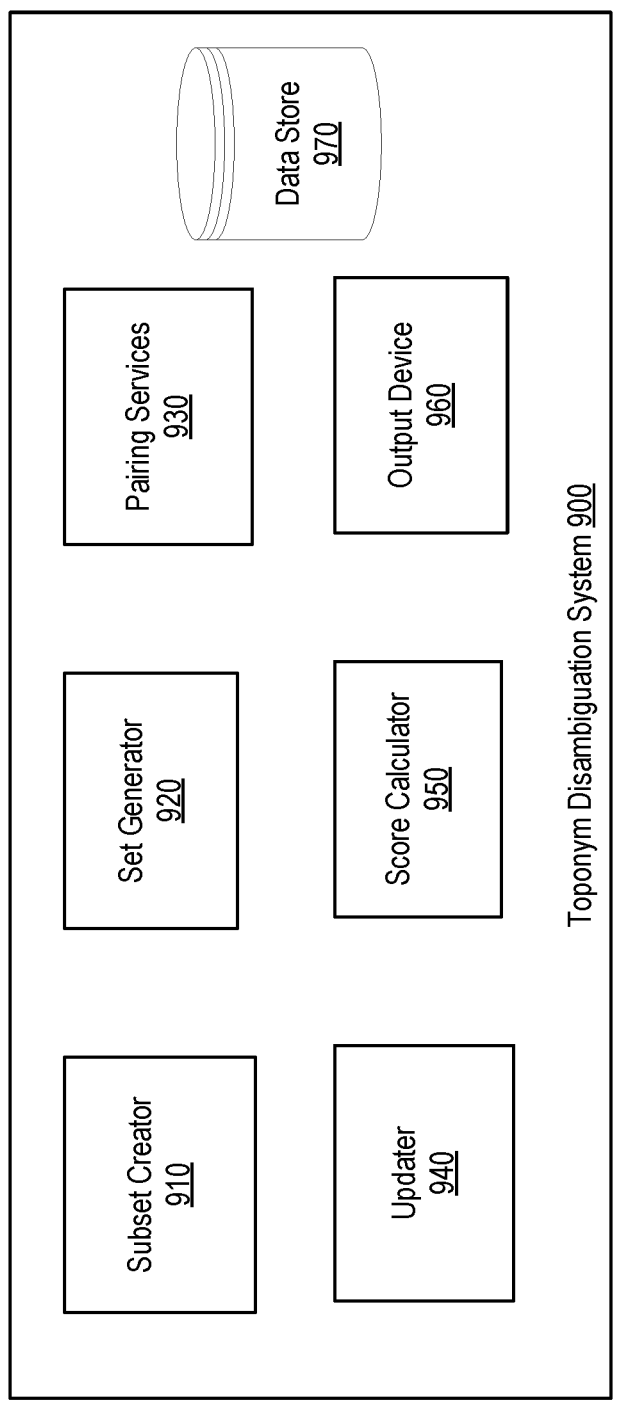
FIG. 9 illustrates a simplified block diagram of a toponym disambiguation system, in accordance with some example embodiments.

FIG. 1 illustrates a method 100 of performing toponym disambiguation for data, in accordance with some example embodiments. The process described in FIG. 1 can be performed by a toponym disambiguation system, such as toponym disambiguation system 900, as shown in FIGS. 8 and 9. The toponym disambiguation system can be part of a data enrichment system. The process described in FIG. 1 can be performed for each column of data in a data set. A data set can also be known as a document (e.g., Excel, JSON, XML). Further, the example described in FIG. 1 describes a province, however, a province can refer to a state in the United States. Although a province is described, location information other than a province can be obtained. Further, although disambiguation is performed with respect to a column of the data in the example described below, disambiguation can be performed for other types of data. The method 100 will be described in further detail below.

Figure 2A:
FIG. 2A illustrates an input column of city names.

FIG. 2A illustrates an input column of city names X 200. The column of city names can be input from a document, such as a spreadsheet. In an example embodiment, the data includes city information, however, the input data does not include province or state information. Therefore, an example embodiment can determine province or state information from the city information.

The column of city names can be input by a user of the data enrichment system, such as a data analyst. In an alternative embodiment, the data enrichment system can automatically ingest data from an identified data source for analysis. In an example embodiment, the input column can be determined by, for example, a data analyst as corresponding to city names. Alternatively, the determination that the column of data corresponds to city names can be determined by a system for determining a type of column information. The determining whether the input column corresponds to a city name can be performed in accordance with example embodiments described in U.S. patent application Ser. No. 14/864,485 titled "TECHNIQUES FOR SIMILARITY ANALYSIS AND DATA ENRICHMENT USING KNOWLEDGE SOURCES," now allowed, which is herein incorporated by reference in its entirety.

FIG. 2B illustrates a reference list of cities R 210. The reference list R can be obtained from a geographical database. The reference list can be, for example, obtained from a geographical database, such as GeoNames, which identifies geographical names for places.

FIG. 2C illustrates a list which is a subset $R_X$ 220 of the reference list of cities R 210, in accordance with some example embodiments.

At step 110, data on which toponym disambiguation is performed, can be received. The data can be a set of cities or a subset of cities from an input column. The subset of an input column of city names X can be received from a user and a reference list of cities R 210, such as from GeoNames, can be obtained. In an example embodiment, the input column of city names X has been normalized. Normalizing the data can include organizing the data, removing any redundant data, and removing any inconsistent data so that the data can be readily used.

For example, the input column of city names X may have been corrected for typographical errors. The reference list of cities R can also contain information for each city such as population, latitude, longitude, province, country, and whether a particular spelling of a city is a preferred spelling. A subset $R_X$ 220 which is a subset of R 210, can be created. Each city in the input column of city names X that has a matching city name in the reference list of cities R 210 is added to the subset $R_X$ 220. A match can be an exact match in the city name. The subset $R_X$ 220 may contain an entry "Cambridge" along with a list of matches: "Cambridge, Ontario", "Cambridge, Mass.", "Cambridge, England", etc.

In an example embodiment, the reference list of cities R 210 and the subset $R_X$ 220 can be linear lists that are stored in a memory. For example, reference list of cities R 210 and the subset $R_X$ 220 can be stored on a distributed file storage system (e.g., Hadoop Distributed File System (HDFS) of the data enrichment system. For example, reference list of cities R 210 and the subset $R_X$ 220 can be stored on distributed storage system 805 of FIG. 8. Alternatively, reference list of cities R 210 and the subset $R_X$ 220 can be part of a compiled Java program.

In another example embodiment, in order to reduce the running time, and therefore increase optimization, the list of cities in the reference list of cities R 210 and the subset of cities $R_X$ 220 can be stored in a hash table, such as a Java HashMap. The hash table can be stored in a memory of the data enrichment system. A new hash table can be created by reading the reference data from disk (e.g. HDFS) into the hash table. A hash table can compute a hash based on, for example, the letters in a word. That hash can serves as an index into an array, and at that array location is a list of matches. By using a hash map, searching through the complete reference list item by item can be avoided, and therefore, run time can be reduced.

In an example embodiment, each value of the HashMap can be a Java List. In the hash table, the key is the city name and the value is a list of possible city matches. For example, a key "CAMBRIDGE" can map to a list including "Cambridge Mass.; Cambridge Ontario; Cambridge England."

The hash table values can include, for example, case class CityInfo(city:String, state: String, population:Int, lat: Double, lon:Double, country: String, isPreferred:Boolean). In an example embodiment, the hash table value "city: String" may not be needed since the city name may have served as the key to reach this value. The hash table (e.g., HashMap and list) can be stored in a memory. FIG. 2D illustrates a reference list of cities R 230 stored in a hash table, and FIG. 2E illustrates a list which is a subset $R_X$ 240 of the reference list of cities R 230 stored in a hash table.

Figure 3:
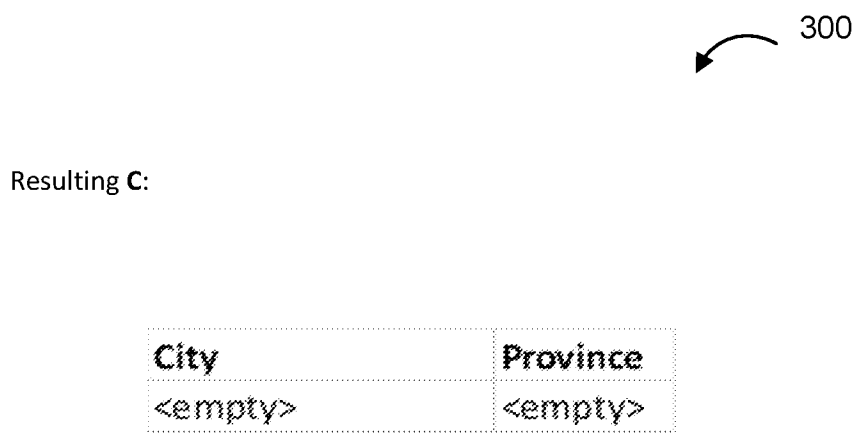

At step 120, a set C is initialized. Set C is initially an empty data set. The set C can be referred to as the initialized set. The set C will hold the output of the algorithm: the <city, province> pairs after performing toponym disambiguation analysis. The set C can hold the geographic location information (e.g., city, province, longitude, latitude, country, population, etc.) after a city and its corresponding province has been determined. That is, the set C can hold disambiguated geographic locations. FIG. 3 illustrates the set C 300, in accordance with some example embodiments. The set C 300 includes city and province, however, the set C can include alternative or additional information based on the desired output. The set C 300 can be displayed on a user interface. Therefore, a user, such as a data analyst, can see the results that appear in set C 300. Set C 300 can be stored in a memory of the data enrichment system.

At step 130, a maximum population variable is set. For example, a variable $p_{max}$ can be set to equal the highest population from all <city,province> pairs in the subset $R_X$. The highest population is the highest human population for that city and province pair. The variable $p_{max}$ can be automatically set by the data enrichment system when the city having the highest population is determined. The variable $p_{max}$ can be a java variable. Alternatively, the city having the highest population can be input by a user. Based on the highest population from the <city,province> pairs shown in FIG. 2C, $p_{max}$ will be set to be 128488. The city Cambridge having a province of England <Cambridge, England> pair, with a population of 128488, has the highest population in the subset $R_X$ 220.

At step 140, the subset $R_X$ and the set C are updated. Any entries in the subset $R_X$ 220 whose associated list has a length of "1" is added to set C and removed from the subset $R_X$. An entry in the subset $R_X$ 220, whose associated list has a length of "1", is an unambiguous province match for that city. The <city,province> pair, whose associated list has a length of "1", is added to set C and the <city,province> pair, whose associated list has a length of "1" is removed from the subset $R_X$ 220.

In the subset $R_X$ 220, shown in FIG. 2C, the cities "Reston" and Sioux City" have a length of 1 since there is only 1 city and province pair for that city. Therefore, "Reston" and Sioux City" are unambiguous cities. The city "Cambridge" has a length of "3" since there are three possible city and province pairs (e.g., <Cambridge, England>, <Cambridge, Mass.> and <Cambridge, Ontario> and the city "Springfield" has a length of "2" since there are two possible city and province pairs (e.g., <Springfield, Ill.>, <Springfield, Va.>. Pairs whose associated list has a length of "1" are removed first since that is the only city and province combination and/or pair for that city.

FIG. 4A illustrates set C 400 now containing the city and province pair that have an associated list length of 1 when set C 200 of FIG. 3 has been updated to include the city and province pair that have an associated list length of 1. FIG. 4B illustrates entries in the subset $R_X$ 410 after the entries having an associated list length of 1 are removed from the subset $R_X$ 220 shown in FIG. 2C, in accordance with some example embodiments. FIG. 4C illustrates entries in the subset $R_X$ 420 stored in a hash table after the entries having an associated list length of 1 are removed, in accordance with some example embodiments.

At step 150, a score is calculated and the subset $R_X$ is updated. The score that is calculated can be called a confidence score and can indicate a degree of confidence regarding a city and province pairing. Step 150 can be repeated until the subset $R_X$ is empty. That is, step 150 can be repeated until there are no further city and province pairs in the subset $R_X$. Step 150 is explained in greater detail below with respect to FIG. 6.

Figure 5:
FIG. 5 illustrates an output set after completing the pairings, in accordance with some example embodiments.

At step 160, the set C is output. The set C is the resulting list of <city, province> pairs. FIG. 5 illustrates the resulting set C 500 or output set after a second full iteration of step 150, in accordance with some example embodiments. That is, FIG. 5 illustrates the set C 500 after two full iterations of step 150. After each iteration, a set C can be output on a display showing current results from performing disambiguation for the input column of data. Alternatively, the set C can be displayed only after all of the pairs in subset $R_X$ have been analyzed.

Figure 6:
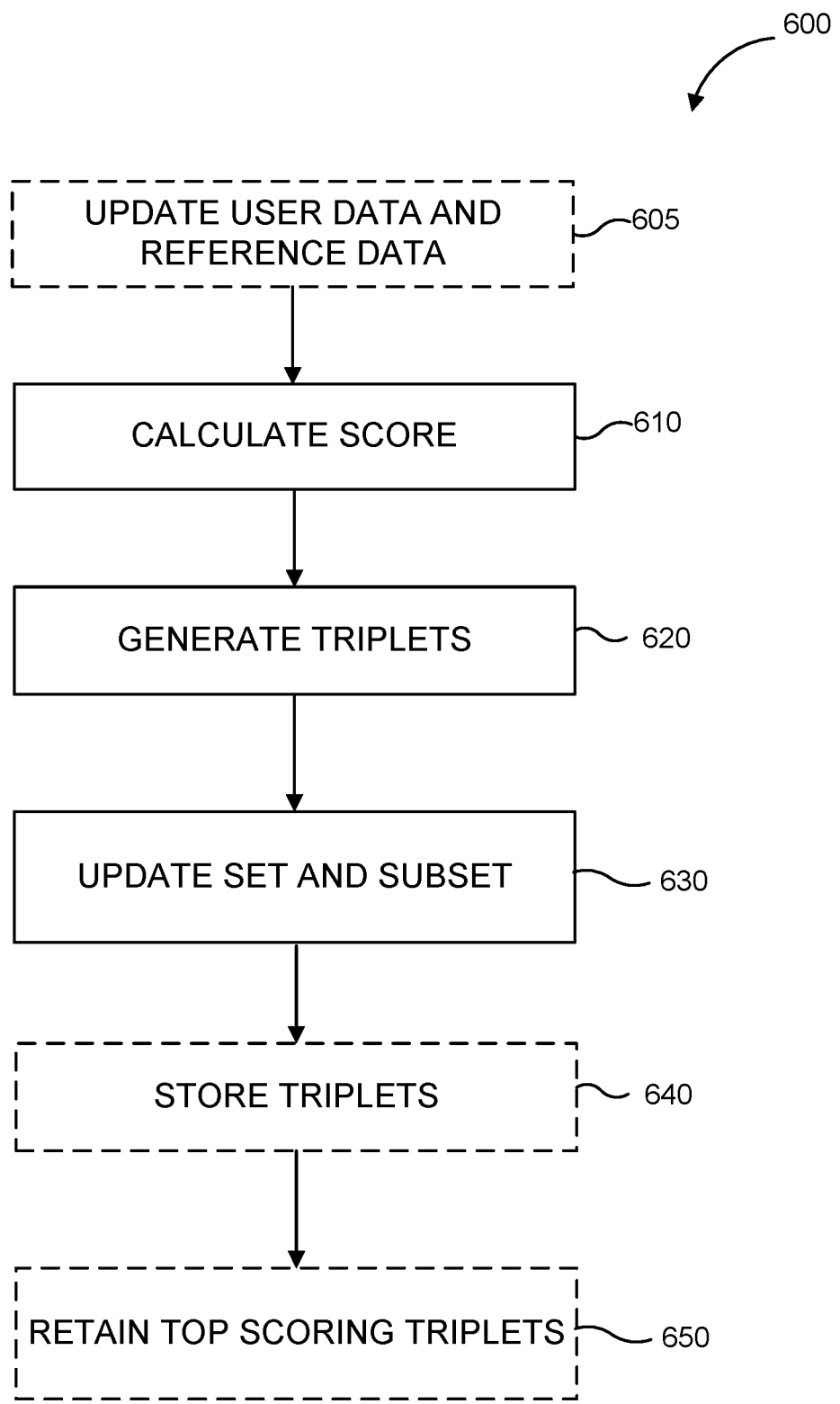
FIG. 6 illustrates a flowchart of a method for calculating a score and updating the set configured to store pairings and the set of city names, in accordance with some example embodiments.

FIG. 6 illustrates a flowchart of a method 600 for calculating a score and updating the set, in accordance with some example embodiments. The score can also be known as a confidence score. The steps shown in FIG. 6 are repeated while there are still city and province pairs in the subset $R_X$. That is, the steps shown in FIG. 6 are repeated until the subset $R_X$ is empty.

In accordance with an example embodiment, in order to reduce false negatives on matching city names, at step 605, both the user data and the reference data can be updated prior to performing the comparison. In the example, both the user data and the reference data are updated, however, only one of the user data and the reference data may need to be updated. For example, the user data and the reference data can be updated so that they are all in uppercase letters. In an example embodiment, the updating is performed at step 605 of FIG. 6, however, in alternative embodiments, this updating can be at other times, such as when the data toponym disambiguation system is initially deployed. For example, prior to step 110 of FIG. 1. If the updating is performed at step 605, the reference data on disk (e.g., HDFS) is untouched. This allows the reference data to be used for other purposes, such as by other programs and/or algorithms.

If the updating is performed when the data toponym disambiguation system is initially deployed, then the updating does not need to be performed every time step 150 of FIG. 1 (calculating a score and updating the set) is performed. Disk space may be needed to maintain both the unnormalized and normalized versions of the data.

This updating may not be performed if it can be readily determined that the data has been normalized. For example, the data analyst may indicate that the data has been normalized or the data enrichment system can determine prior to calculating the score that the data has been normalized.

The user data and the reference data can also be updated so that diacritics are removed. A diacritic can be a sign, such as an accent or cedilla, which when written above or below a letter, or between letters, and can indicate a difference in pronunciation from the same letter when unmarked or differently marked. For example, if "São Paulo" appears in the user data but only "Sao Paulo" appears in the reference list of cities R, then "São Paulo" in the user data would not get matched to "Sao Paulo" in the reference list. Therefore, diacritics can be removed. Further, the user data and the reference data can be updated so that all whitespace is removed. Whitespaces can include Unicode whitespace. An example embodiment can be configured and/or programmed so as to update the data.

At step 610, a heuristic score is calculated for the city and province pairs that remain in the subset $R_X$. That is, for every city name entry in the subset $R_X$ and for every matching province for that entry, a heuristic score is calculated against the already-assigned city in the set C. The city and province pairs currently in set C can be determined after performing step 140 of FIG. 1.

The score that is calculated can include a combination of unassigned-city, potential-province-for-the-unassigned-city, and an-already-assigned-city. This combination can be called a triplet, called a triplet <u,p,a>. The variable u representing the unassigned city, the variable p representing a potential province for the unassigned city and the variable a representing an already assigned city. The set of resulting scores S containing triplets can be called <u,p,score>. Therefore, once there is a score, the variable "a" may no longer be needed.

A score for a city and province pair can be calculated based on the following equation.

$$\text{score} = \alpha_1 \frac{\log(c_{pop})}{\log(p_{max})} + \alpha_2 \left(1 - \frac{\log(\text{haversine}(c_{lat}, c_{lon}, a_{lat}, a_{lon}))}{\log(d_{max})}\right) + \alpha_3 \begin{cases} 0 \text{ if } c_{country} \neq a_{country} \\ 1 \text{ if } c_{country} = a_{country} \end{cases} + \alpha_4 \begin{cases} 0 \text{ if } c_{isPreferredSpelling} \\ 1 \text{ if not } c_{isPreferredSpelling} \end{cases} \quad (1)$$

If, for example, the pair <u,p> always unambiguously identifies a city from R, values like population can be enabled so as to be unambiguously looked up. A look-up can be denoted as, for example, $c_{pop}$ where c refers to the pair <u,p>. The variable $c_{pop}$ can represent the population of the city that is being analyzed.

In the equation, haversine( ) refers to the a Haversine Formula for computing the distance between two points on earth given their latitudes and longitudes. $d_{max}$ refers to the maximum possible distance which is $\pi r_e$ with $r_e$=6371 km. The constant $r_e$ represents the radius of the earth. The constants $\alpha_1$-$\alpha_4$ can be represented by the following values: $\alpha_1$=1.0, $\alpha_2$=0.2, $\alpha_3$=0.2, and $\alpha_4$=0.2. $\alpha_1$ can correspond to population, $\alpha_2$ can correspond to distance, $\alpha_3$ can correspond to whether it is in the same country, and $\alpha_4$ can correspond to whether or not it is a preferred spelling. The values for $\alpha_1$-$\alpha_4$ can be input by a user, such as a data analyst. Further, the values $\alpha_1$-$\alpha_4$ can be can be based on empirical data as determined by the user in order to obtain a desired output score.

The variable cat represents the latitude of the city being analyzed. The variable $c_{lon}$ represents the longitude of the city being analyzed. The variable $a_{lat}$ represents the latitude of an already assigned city. The variable anon represents the longitude of an already assigned city. The variable $p_{max}$ represents the highest population from all <city,province> pairs in the subset $R_X$. The variable $c_{country}$ represents a country of a candidate city. The variable $a_{country}$ represents the country of an already assigned city. The variable $c_{isPreferredSpelling}$ represents whether the spelling of the candidate city is the preferred spelling for that real-world city. The "is" in "isPreferredSpelling" can be used to indicate a true/false Boolean value.

In an example embodiment, in order to reduce the running time, an equirectangular approximation to Haversine can be used instead of the regular Haversine. An equirectangular approximation to Haversine can increase efficiency (e.g., save time) because it can perform trigonometry functions in only one dimension instead of two dimensions. By using the equation to calculate the score, runtime performance can be increased with minimal effects on heuristic accuracy. Specifically, the accuracy for performing toponym disambiguation on city information can be increased.

FIG. 7A illustrates the resulting list S 700 including scores, in accordance with some example embodiments. In an example embodiment, the assigned city a may not be needed one the score has been computed. However, in the example shown in FIG. 6A, the assigned city a is shown. In the example shown in FIG. 7A, the score is calculated for each city and province combination in relation to an already assigned city a. In the example shown in FIG. 7A, the cities Reston and Sioux City were already assigned in, for example, step 140 of FIG. 1 and as shown in set C 400 of FIG. 4A. FIG. 7G illustrates the resulting list S 760 including scores, in accordance with some example embodiments. In the resulting list S 760, scores are maintained from one iteration to the next, as described in step 640. The resulting list S 760 can be stored in a memory of the data enrichment system.

At step 620, a list of triplets can be created for the unassigned city, potential province for the unassigned city and score triplets. That is, a list S' can be created that includes <u,p,score'> triplets as shown in FIG. 7D. For every unassigned city u, there is now from the preceding step (e.g., step 610) a list (of at least length of 2) of <p,score> pairs. The list S' can be sorted by descending score for each unassigned city u. The first entry can be identified as the highest score or winning score. In an example, the first entry can be entry A. The second entry can be identified as the second highest score or runner-up score. In an example, the second entry can be entry B. For every u, put into S' the pair <u,score'> where $$\text{score}' = A_{score} + \alpha_5 \frac{A_{score} - B_{score}}{\alpha_1 + \alpha_2 + \alpha_3 + \alpha_4}$$

In an example embodiment, the constant as can be valued at 10. The constant value can be determined by a user, such as a data analyst. Alternatively, the constant value can be determined independently by the data enrichment system, based on desired results.

FIG. 7B illustrates the list S reformatted into a list-style with each list sorted by descending score, in accordance with some example embodiments. FIG. 7C illustrates the list S with each list truncated to include the first entry (winner) and the second entry (runner-up), in accordance with some example embodiments.

At step 630, the set C and the subset $R_X$ is updated. For the <u,p,score'> triplet in list S' with the highest score', the pair <u,p> is inserted into the set C and the entry u is deleted or removed from the subset $R_X$. The associated list of potentially matching provinces can also be deleted or removed. In the described example, the <u,p,score'> triplet in list S' with the highest score' is Cambridge, Ontario. FIG. 7E illustrates the resulting set C 740 with Cambridge, Ontario added to the set C 400 of FIG. 4A. FIG. 7F illustrates the resulting subset $R_X$ 750 with the previously unassigned city Cambridge now removed from the $R_X$ 750.

Figure 13:
FIG. 13 illustrates a set of scoring triplets, in accordance with some example embodiments.

In an example embodiment, in order to reduce the running time, at step 640, the scores that were calculated for the <u,p,a> triplets in step 610 can be kept for the next iteration. Because the <u,*,*> triplets can be extraneous and can produce erroneous results, the <u,*,*> triplets can be deleted from the collection of triplets. The triplets <u,*,*> can refer to triplets that have the first component equal to the u from step 630 and the second and third components can be anything. Only the <*,*,a> where a=u where u is from step 630, is incrementally added in step 610 to the set of triplets. FIG. 13 illustrates the triplets 1300 which are added to the set of triplets in step 610, in accordance with some example embodiments.

The triplets can be stored as follows: var cartesianScores=HashMap[CityInfo, ListBuffer[(CityInfo, Double)]]( ). Cartesian can refer to a cartesian product. It can keep track of scores between all possible pairs of cities. The scores are tracked between all possible pairs of cities because the distance, which is a component of the score, can be different for each pair of cities.

In an example embodiment, the table of scores is maintained for all iterations. For each iteration, all rows that correspond to the just-resolved ambiguity can be deleted. For example, the rows corresponding to "Cambridge Mass.", "Cambridge Ontario", and "Cambridge England" can be deleted. Further, one row can be added corresponding to the now-resolved ambiguity. For example, if it is determined that "Cambridge Ontario" resolves the "CAMBRIDGE" ambiguity then a column can be added for that.

Figure 14:
FIG. 14 illustrates the top scoring triplets, in accordance with some example embodiments.

Further, in an example embodiment, in order to reduce the running time, in step 650, for all of the <x,*,*> triplets, only the top two-scoring <x,*,*> triplets may be kept for the next iteration. For example, instead of keeping all scores in the set of resulting scores S for each ambiguous city, only, for example, the top two scoring triplets are kept for a next iteration. For example, if Cambridge Mass. has a score of 0.9, Cambridge England has a score of 0.7, and Cambridge Ontario has a score of 0.6, then Cambridge Ontario can be removed from the set of resulting scores S. FIG. 14 illustrates the top two scoring triplets, in accordance with some example embodiments. This is merely an example, and the number of triplets that are maintained can be modified based on the results desired by the user. In accordance with an example embodiment, not all triplets need to be maintained in the set of resulting scores S.

Therefore, an example embodiment can process and assign provinces to cities in order of confidence. Additional information for a geographic location (e.g., city) can be quickly determined. Further, since provinces have been assigned to the city in order of confidence, employed heuristics can be more effective and accurate. Specifically, heuristics, such as distance and same-country, can be more effective and accurate. Heuristics can also include population, whether a spelling matches a spelling that is identified as a preferred spelling in a reference list, such as geo names, and how much further ahead a winning match is from a runner-up match for a same city. The city information that has been disambiguated can be used to performed predictive analysis and to create data models. For example, the disambiguated city information can be used to determine what products should be offered in particular regions and the customers that should be targeted.

Further, an example embodiment provides a data enrichment system that can perform the toponym disambiguation quickly and independently.

Data Enrichment System

FIG. 8 illustrates a simplified block diagram of data enrichment system 800, in accordance with some example embodiments. Data enrichment system 800 may implement a data enrichment service 802. Data enrichment service 802 can be part of a data enrichment system. Data enrichment service 802 can receive data enrichment requests from one or more clients 804. Data enrichment service 802 may comprise one or more computers and/or servers. Data enrichment service 802 may be a module that is comprised of several subsystems and/or modules, including some, which may not be shown. Data enrichment service 802 may have more or fewer subsystems and/or modules than shown in the figure, may combine two or more subsystems and/or modules, or may have a different configuration or arrangement of subsystems and/or modules. In some embodiments, data enrichment service 802 may include user interface 806, ingest engine 828, recommendation engine 808, knowledge service 810, profile engine 826, transform engine 822, a prepare engine 812, publish engine 824, and semantic analysis engine 844. The elements implementing data enrichment service 802 may operate to implement a semantic processing pipeline as described above.

Data enrichment system 800 may include a semantic processing pipeline, in accordance with an embodiment of the present disclosure. All or part of the semantic processing pipeline may be implemented by data enrichment service. When a data source is added, the data source and/or the data stored thereon can be processed through a pipeline prior to loading the data source. The pipeline can include one or more processing engines that are configured to process the data and/or data source before publishing the processed data to one or more data targets. The processing engines can include an ingest engine that extracts raw data from the new data source and provides the raw data to a prepare engine. The prepare engine can identify a format associated with the raw data and can convert the raw data into a format (e.g., normalize the raw data) that can be processed by the data enrichment service 802. A profile engine can extract and/or generate metadata associated with the normalized data and a transform engine can transform (e.g., repair and/or enrich) the normalized data based on the metadata. The resulting enriched data can be provided to the publish engine to be sent to one or more data targets. Each processing engine is described further below.

In some embodiments, data enrichment service 802 may be provided by a computing infrastructure system (e.g., a cloud computing infrastructure system). The computing infrastructure system may be implemented in a cloud computing environment having one or more computing systems. The computing infrastructure system may be communicatively coupled, over one or more communication networks, to one or more data sources or one or more data targets such as those described herein.

The client's 804 can include various client devices (such as desktop computers, laptop computers, tablet computers, mobile devices, etc.). Each client device can include one or more client applications 804 through which the data enrichment service 802 can be accessed. For example, a browser application, a thin client (e.g., a mobile app), and/or a thick client can execute on the client device and enable the user to interact with the data enrichment service 802. The embodiment depicted in FIG. 8 is merely an example and is not intended to unduly limit the claimed embodiments of the present disclosure. One of ordinary skill in the art would recognize many variations, alternatives, and modifications. For example, there may be more or fewer client devices than those shown in the figures.

The client devices 804 may be of various different types, including, but not limited to personal computers, desktops, mobile or handheld devices such as a laptop, a mobile phone, a tablet, etc., and other types of devices. A communication network facilitates communications between client devices 804 and data enrichment service 802. The communication network can be of various types and can include one or more communication networks. Examples of a communication network can include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, the communication network may include any communication network or infrastructure that facilitates communications between clients and data enrichment service 802.

A user can interact with the data enrichment service 802 through user interface 806. Clients 804 can render a graphical user interface to display the user's data, recommendations for transforming the user's data, and to send and/or receive instructions ("transformation instructions") to the data enrichment service 802 through user interface 806. The user interfaces may be rendered by data enrichment service 802 or via clients 804. For example, a user interface may be generated by user interface 806, and rendered by data enrichment service 802 at any one of clients 804. A user interface may be provided by data enrichment system 802 via network as part of a service (e.g., a cloud service) or a network-accessible application. In at least one example, an operator of a data enrichment service 802 may operate one of clients 804 to access and interact with any user interfaces disclosed herein. The user can send instructions to user interface 806 to add data sources (e.g., provide data source access and/or location information, etc.).

Data enrichment service 802 may ingest data using ingest engine 828. Ingest engine 828 can serve as an initial processing engine when a data source is added. The ingest engine 828 can facilitate safe, secure, and reliable uploading of user data from one or more data sources 809 into data enrichment service 802. In some embodiments, ingestion engine 828 can extract data from the one or more data sources 809 and store it in a distributed storage system 805 in data enrichment service 802. Data ingested from one or more data sources 809 and/or one or more clients 804 can be processed and stored in a distributed storage system 805. Data enrichment service 802 can receive data from a client data store 807 and/or from one or more data sources 809. The distributed storage system 805 can serve as temporary storage for the uploaded data during the remaining processing stages of the pipeline, prior to the data being published to one or more data targets 830. Once an upload is complete, the prepare engine 812 can be invoked to normalize the uploaded data set.

The received data may include structured data, unstructured data, or a combination thereof. Structure data may be based on data structures including, without limitation, an array, a record, a relational database table, a hash table, a linked list, or other types of data structures. As described above, the data sources can include a public cloud storage service 811, a private cloud storage service 813, various other cloud services 815, a URL or web-based data source 817, or any other accessible data source.

A data enrichment request from the client 804 can identify a data source and/or particular data (tables, columns, files, or any other structured or unstructured data available through data sources 809 or client data store 807). Data enrichment service 802 may then access the identified data source to obtain the particular data specified in the data enrichment request. Data sources can be identified by address (e.g., URL), by storage provider name, or other identifier. In some embodiments, access to a data source may be controlled by an access management service. The client 804 may display a request to the user to input a credential (e.g., username and password) and/or to authorize the data enrichment service 802 to access the data source.

In some embodiments, data uploaded from the one or more data sources 809 can be modified into various different formats. The prepare engine 812 can convert the uploaded data into a common, normalized format, for processing by data enrichment service 802. Normalizing may be performed by routines and/or techniques implemented using instructions or code, such as Apache Tika distributed by Apache®. The normalized format provides a normalized view of data obtained from the data source. In some embodiments, the prepare engine 812 can read a number of different file types. Prepare engine 812 can normalize the data into a character separated form (e.g., tab separated values, comma separated values, etc.) or as a JavaScript Object Notation (JSON) document for hierarchical data.

In some embodiments, various file formats can be recognized and normalized. For example, standard file formats such as Microsoft Excel® formats (e.g., XLS or XLSX), Microsoft Word® formats (e.g., DOC or DOCX), and portable document format (PDF), and hierarchical formats like JSON and extended markup language (XML), can be supported. In some embodiments, various binary encoded file formats and serialized object data can also be read and decoded. In some embodiments, data can be provided to the pipeline in Unicode format (UTF-8) encoding. Prepare engine 812 can perform context extraction and conversion to the file types expected by data enrichment service 802, and can extract document level metadata from the data source.

Normalizing a data set mat include converting raw data in a data set into a format that that can be processed by the data enrichment service 802, in particular profile engine 826. In one example, normalizing the data set to create a normalized data set includes modifying the data set having one format to an adjusted format as a normalized data set, the adjusted format being different from the format. A data set may be normalized by identifying one or more columns of data in the data set, and modifying a format of the data corresponding to the columns to the same format. For example, data having different formatted dates in a data set may be normalized by changing the formats to a common format for the dates that can be processed by profile engine 826. Data may be normalized by being modified or converted from a non-tabular format to a tabular format, having one or more columns of data.

Once the data has been normalized, the normalized data can be passed to profile engine 826. The profile engine 826 can perform a column by column analysis of normalized data to identify the types of data stored in the columns and information about how the data is stored in the columns. In this disclosure, although profile engine 826 is described in many instances as performing operations on data, the data processed by profile engine 826 has been normalized by prepare engine 812. In some embodiments, the data processed by profile engine 826 may include data that is not normalized for being in a format (e.g., a normalized format) that can be processed by profile engine 826. The output, or results, of profile engine 826 may be metadata (e.g., source profile) indicating profile information about the data from a source. The metadata may indicate one or more patterns about the data and/or a classification of the data. As further described below, the metadata may include statistical information based on analysis of the data. For example, profile engine 826 can output a number of metrics and pattern information about each identified column, and can identify schema information in the form of names and types of the columns to match the data.

The metadata generated by profile engine 826 may be used by other elements of data enrichment service, e.g., recommendation engine 808 and transformation engine 822, to perform operations as described herein for data enrichment service 802. In some embodiments, the profile engine 826 can provide metadata to a recommendation engine 808.

Recommendation engine 808 can identify repair, transform, and data enrichment recommendations for the data processed by profile engine 826. The metadata generated by profile engine 826 can be used to determine recommendations for data based on the statistical analysis and/or classifications indicated by the metadata. In some embodiments, recommendations can be provided to the user through a user interface or other web service. Recommendations can be tailored for business users, such that the recommendations describe at a high level what data repairs or enrichments are available, how those recommendations compare to past user activity, and/or how unknown items can be classified based on existing knowledge or patterns. Knowledge service 810 can access one or more knowledge graphs or other knowledge sources 840. The knowledge sources can include publicly available information published by web sites, web services, curated knowledge stores, and other sources. Recommendation engine 808 can request (e.g., query) knowledge service 810 for data that can be recommended to a user for the data obtained for a source.

In some embodiments, transform engine 822 can present the user with the sampled data for each column, or sample rows from the input dataset through user interface 806. Through user interface 806, data enrichment service 802 may present a user with recommended transformations. The transformations may be associated with transformation instructions, which may include code and/or function calls to perform transformation actions. The transformation instructions may be invoked by a user based on selection at user interface 806, such as by selecting a recommendation for transformation or by receiving input indicating an operation (e.g., an operator command). In one example, transformation instructions include a transformation instruction to rename at least one column of data based on the entity information. A further transformation instruction can be received to rename the at least one column of data to a default name. A default name may include a name that is pre-determined. A default name may be any name that is pre-defined when a name for a column of data cannot be determined or is not defined. The transformation instructions can include a transformation instruction to reformat at least one column of data based on the entity information, and a transformation instruction to obfuscate at least one column of data based on the entity information. In some embodiments, the transformation instructions can include an enrichment instruction to add one or more columns of data obtained from the knowledge service based on the entity information.

Through user interface 806, a user can perform transform actions, and the transform engine 822 can apply them to the data obtained from a data source and display the results. This gives the user immediate feedback that can be used to visualize and verify the effects of the transform engine 822 configuration. In some embodiments, the transform engine 822 can receive pattern and/or metadata information (e.g., column names and types) from profile engine 826 and recommendation engine 808, which provides recommended transform actions. In some embodiments, transform engine 822 can provide a user event model that orchestrates and tracks changes to the data to facilitate undo, redo, delete, and edit events. The model can capture dependencies between actions so that the current configuration is kept consistent. For example, if a column is removed, then recommended transform actions provided by the recommendation engine 808 for that column can also be removed. Similarly, if a transform action results in inserting new columns and that action is deleted, then any actions performed on the new columns are also deleted.

As described above, during processing the received data can be analyzed and a recommendation engine 808 can present one or more recommended transforms to be made to the data, including enrichment, repair, and other transforms. A recommended transform for enriching data may be comprised of a set of transforms, each transform of which is a single transform action, or an atomic transformation, performed on the data. A transform may be performed on data that was previously transformed by another transform in the set. The set of transforms may be performed in parallel or in a particular order, such that the data resulting after performing the set of transforms is enriched. The set of transforms may be performed according to a transform specification. The transform specification may include transformation instructions that indicate how and when to perform each of the set of transforms on the data produced by profile engine 826 and the recommendation for enriching the data determined by recommendation engine 808. Examples of the atomic transformation may include, without limitation, transforms to headers, conversions, deletions, splits, joins, and repairs. The data that is transformed according to the set of transforms may undergo a series of changes, each of which results in intermediate data the data is enriched. The data generated for intermediate steps for the set of transforms may be stored in a format such as an Resilient Distributed Dataset (RDD), text, a data record format, a file format, any other format, or a combination thereof.

In some embodiments, the data generated as a result of the operations performed by any elements of data enrichment service 802 may be stored in an intermediary data format including, but not limited to, RDD, text, a document format, any other type of format, or a combination thereof. The data stored in the intermediary format may be used to further perform operations for data enrichment service 802.

The following tables illustrate examples of transformations. Table 1 shows an outline of types of transforms actions.

TABLE 1

| Transform Types | Function Parameter(s) | Description | Examples |
| --- | --- | --- | --- |
| Update | String => String | Update column values | Obfuscate, date format, |
| Split | String => Array[String] | Split a column's values into new columns | Regex split, delimiter split |

TABLE 1-continued

| Transform Types | Function Parameter(s) | Description | Examples |
|---|---|---|---|
| Filter | String => Boolean | Filter rows based on a single column's values | White list filtering, date range filtering |
| Multi-column Filter | Array[String] => Boolean | Filter rows based on multiple column values | NER false positives filtering |
| Edit Columns | Array[String] => Array[String] | Edit the existing columns | Reorder, remove, swap columns |
| Extract | (String, String) => Array[Array[String]] | Extract values from a column into a new RDD | NER with results extracted to a new table |
| Insert | String => Array[String] | Insert new columns | Insert timestamp |
| Insert 1:M | String => Array[Array[String]] | Insert new columns in a one-to-many way | Insert NER results |

Table 2 shows transform actions that do not fit within the category types shown with reference to Table 1.

TABLE 2

| Transform Actions | Description |
|---|---|
| Rename column | Rename a column |
| Sample | Replace the current RDD with a sample of it |
| Join | Performs a left-outer-join between two RDDs |
| Export | Export an RDD as columnar data to e.g. HDFS |

Table 3 below shows examples of types of transform examples. Specifically Table 3 shows examples of transform actions and describes the type of transformations corresponding to those actions. For example, a transform action may include filtering data based on detecting the presence of words from a white list in data. If a user wants to track communications (e.g., tweets) containing "Android" or "iPhone", a transform action could be added with those two words comprising the provided white list. This is just one example of the way by which data could be enriched for a user.

TABLE 3

| Transform Actions | Description | Input | Output | R1 |
|---|---|---|---|---|
| Obfuscate | Obfuscate sensitive information such as e.g. credit card numbers, ID's, or birth dates | 123-45-6789 | ###-##-#### | Y |
| Date Reformat | Reformat a column containing a date | 1330978536 2012-03-12 14:13:49 | March 05, 2012 03/12/12 02:13:49 PM | Y |
| Rename Column | Rename a column | tagged_0001 text_label_0005 | user_agent call_letters | Y |
| NER | Perform named entity recognition and insert values (see next section) | PopBooth turns your iPhone or iPad into a photo booth, prints and all | Type: Product Text: PopBooth, iPhone, iPad | Y |
| Search/ Replace | Perform search and replace on a column's values | Search: Mozilla Replace: Godzilla Value: Mozilla 5.0 | Value: Godzilla 5.0 | Y |
| Change case | Change the case to lower, upper, or proper | Case: Proper Value: eden prairie | Value: Eden Prairie | Y |
| White list filter | Filter rows based on the presence of words from a white list in a text-valued column | List: Android, iPhone Value: I heart my iPhone | Keep all rows whose values contain "Android" or "iPhone" | Y |

The recommendation engine 808 can use information from a knowledge service 810, knowledge source 840 to generate recommendations for transform engine 822 and to instruct transform engine 822 to generate transform scripts that will transform the data. Transform scripts may include programs, code, or instructions that may be executable by one or more processing units to transform received data. As such, the recommendation engine 808 can serve as an intermediary between the user interface 806 and the knowledge service 810.

As discussed above, profile engine 826 can analyze data from a data source to determine whether any patterns exist, and if so, whether a pattern can be classified. Once data obtained from a data source is normalized, the data may be parsed to identify one or more attributes or fields in the structure of the data. Patterns may be identified using a collection of regular expressions, each having a label ("tag") and being defined by a category. The data may be compared to different types of patterns to identify a pattern. Examples of pattern types that can be identified include, without limitation, integers, decimals, dates or date/time strings, URLs, domain addresses, IP addresses, email addresses, version numbers, locale identifiers, UUIDs and other hexidecimal identifiers, social security numbers, US box numbers, typical US street address patterns, zipcodes, US phone numbers, suite numbers, credit card numbers, proper names, personal information, and credit card vendors.

In some embodiments, profile engine 826 may identify patterns in data based on a set of regular expressions defined by semantic constraints or syntax constraints. A regular expression may be used to determine the shape and/or structure of data. Profile engine 826 may implement operations or routines (e.g., invoke an API for routines that perform processing for regular expressions) to determine patterns in data based on one or more regular expressions. For example, a regular expression for a pattern may be applied to data based on syntax constraints to determine whether the pattern is identifiable in the data.

Profile engine 826 may perform parsing operations using one or more regular expressions to identify patterns in data processed by profile engine 826. Regular expressions may be ordered according to a hierarchy. Patterns may be identified based on order of complexity of the regular expressions. Multiple patterns may match data that is being analyzed; the patterns having the greater complexity will be selected. As described further below, profile engine 826 may perform statistical analysis to disambiguate between patterns based on the application of regular expressions that are applied to determine those patterns.

In some embodiments, data that is unstructured may be processed to analyze metadata-describing attributes in the data. The metadata itself may indicate information about the data. The metadata may be compared to identify similarities and/or to determine a type of the information. The information identified based on the data may be compared to know types of data (e.g., business information, personal identification information, or address information) to identify the data that corresponds to a pattern.

In accordance with an embodiment, the profile engine 826 may perform statistical analysis to disambiguate the patterns and/or the text in data. Profile engine 826 may generate metadata including statistical information based on the statistical analysis. When patterns are identified, profile engine 826 may determine statistical information (e.g., a pattern metric) about each different pattern to disambiguate between the patterns. The statistical information may include a standard deviation for different patterns that are recognized. The metadata including the statistical information can be provided to other components of data enrichment service 802, such as recommendation engine 808. For example, the metadata may be provided to recommendation engine 808 to enable recommendation engine 808 to determine recommendations for enrichment of the data based on the identified the pattern(s). Recommendation engine 808 can use the patterns to query a knowledge service 810 to obtain additional information about the patterns. Knowledge service 810 can include or have access to one or more knowledge sources 840. A knowledge sources can include publicly available information published by web sites, web services, curated knowledge stores, and other sources.

Profile engine 826 may perform the statistical analysis to disambiguate between patterns identified in the data. For example, data analyzed by profile engine 826, may be evaluated to compute a pattern metric (e.g., a statistical frequency of different patterns in the data) for each of the different patterns identified in the data. Each of the set of pattern metrics is computed for a different pattern of the patterns that are identified. Profile engine 826 may determine a difference amongst the pattern metrics computed for the different patterns. One of the identified patterns may be selected based on the difference. For example, one pattern may be disambiguated from another pattern based on a frequency of the patterns in the data. In another example, where the data consists of dates having multiple different formats, each corresponding to a different pattern, profile engine 826 may convert the dates to a standard format in addition to normalization and may then determine a standard deviation for each format from different patterns. In this example, profile engine 826 may statistically disambiguate between the formats in the data as having the format with the lowest standard deviation. The pattern corresponding to the format of the data having the lowest standard deviation may be selected as the best pattern for the data.

Profile engine 826 may determine a classification of a pattern that it identifies. Profile engine 826 may communicate with knowledge service 810 to determine whether the identified pattern can be classified within a knowledge domain. Knowledge service 810 may determine one or more possible domains associated with the data based on techniques described herein such as matching techniques and similarity analysis. Knowledge service 810 may provide profile engine 826 with a classification of one or more domains possibly similar to data identified with a pattern. Knowledge service 810 may provide, for each of the domains identified by knowledge service 810, a similarity metric indicating a degree of similarity to the domain. The techniques disclosed herein for similarity metric analysis and scoring can be applied by recommendation engine 808 to determine a classification of data processed by profile engine 826. The metadata generated by profile engine 826 may include information about the knowledge domain, if any are applicable, and a metric indicating a degree of similarity with the data analyzed by profile engine 826.

Profile engine 826 may perform statistical analysis to disambiguate text identified in data, regardless of whether patterns are identified in the data. The text may be part of a pattern, and the analysis of the text may be used to further identify a pattern, if any can be identified. Profile engine 826 may request knowledge service 810 to perform domain analysis on text to determine whether the text can be classified into one or more domains. Knowledge service 810 may operate to provide information about one or more domains that are applicable to the text being analyzed. Analysis performed by knowledge service 810 to determine a domain may be performed using techniques described herein, such as similarity analysis used to determine a domain for data.

In some embodiments, profile engine 826 may identify text data in a data set. The text data may correspond to each entity identified in the set of entities. A classification may be determined for each entity that is identified. Profile engine 826 may request knowledge service to identify a classification for the entity. Upon determining a set of classifications for a set of entities (e.g., entities in a column), profile engine 826 may compute a set of metrics ("classification metrics") to disambiguate between the set of classifications. Each of the set of metrics may be computed for a different one of the set of classifications. Profile engine 826 may statistically disambiguate the set of metrics by comparing them to each other to determine which classification most closely represents the set of entities. A classification of the set of entities may be chosen based on the classification that represents the set of entities.

Using the knowledge sources 840, knowledge service 810 can match, in context, the patterns identified by profile engine 826. Knowledge service 810 may compare the identified patterns in the data or the data if in text to entity information for different entities stored by a knowledge source. The entity information may be obtained from one or more knowledge sources 840 using knowledge service 810. Examples of known entity may include social security numbers, telephone numbers, address, proper names, or other personal information. The data may be compared to entity information for different entities to determine if there is a match with one or more entities based on the identified pattern. For example, the knowledge service 810 can match the pattern "XXX-XX-XXXX" to the format of U.S. social security numbers. Furthermore, the knowledge service 810 can determine that social security numbers are protected or sensitive information, the disclosure of which is linked to various penalties.

In some embodiments, profile engine 826 can perform statistical analysis to disambiguate between multiple classifications identified for data processed by profile engine 826. For example, when text is classified with multiple domains, profile engine 826 can process the data to statistically determine the appropriate classification determined by knowledge service 810. The statistical analysis of the classification can be included in the metadata generated by profile engine 826.

In addition to pattern identification, profile engine 826 can analyze data statistically. The profile engine 826 can characterize the content of large quantities of data, and can provide global statistics about the data and a per-column analysis of the data's content: e.g., its values, patterns, types, syntax, semantics, and its statistical properties. For example, numeric data can be analyzed statistically, including, e.g., N, mean, maximum, minimum, standard deviation, skewness, kurtosis, and/or a 20-bin histogram if N is greater than 100 and unique values is greater than K. Content may be classified for subsequent analysis.

In one example, global statistics may include, without restriction, the number of rows, the number of columns, the number of raw and populated columns and how they varies, distinct and duplicate rows, header information, the number of columns classified by type or subtype, and the number of columns with security or other alerts. Column-specific statistics may include populated rows (e.g., K-most frequent, K-least frequent unique values, unique patterns, and (where applicable) types), frequency distributions, text metrics (e.g., minimum, maximum, mean values of: text length, token count, punctuation, pattern-based tokens, and various useful derived text properties), token metrics, data type and subtype, statistical analysis of numeric columns, L-most/least probable simple or compound terms or n-grams found in columns with mostly unstructured data, and reference knowledge categories matched by this naive lexicon, date/time pattern discovery and formatting, reference data matches, and imputed column heading label.

The resulting profile can be used to classify content for subsequent analyses, to suggest, directly or indirectly, transformations of the data, to identify relationships among data sources, and to validate newly acquired data before applying a set of transformations designed based on the profile of previously acquired data.

The metadata produced by profile engine 826 can be provided to the recommendation engine 808 to generate one or more transform recommendations. The entities that match an identified pattern of the data can be used to enrich the data with those entities identified by classification determined using knowledge service 810. In some embodiments, the data to the identified patterns (e.g., city and state) may be provided to knowledge service 810 to obtain, from a knowledge source 840, entities that match the identified patterns. For example, knowledge service 810 may be invoked calling a routine (e.g., getCities( ) and getStates( )) corresponding to the identified patterns to receive entity information. The information received from knowledge service 810 may include a list (e.g., canonical list) of entities that have properly spelled information (e.g., properly spelled cities and states) for the entities. Entity information corresponding to matching entities obtained from knowledge service 810 can be used to enrich data, e.g., normalize the data, repair the data, and/or augment the data.

In some embodiments, the recommendation engine 808 can generate transform recommendations based on the matched patterns received from the knowledge service 810. For example, for the data including social security numbers, the recommendation engine can recommend a transform that obfuscates the entries (e.g., truncating, randomizing, or deleting, all or a portion of the entries). Other examples of transformation may include, reformatting data (e.g., reformatting a date in data), renaming data, enriching data (e.g., inserting values or associating categories with data), searching and replacing data (e.g., correcting spelling of data), change case of letter (e.g., changing a case from upper to lower case), and filter based on black list or white list terms. In some embodiments, recommendations can be tailored for particular users, such that the recommendations describe at a high level what data repairs or enrichments are available. For example, an obfuscation recommendation may indicate that the first five digits of the entries will be deleted. In some embodiments, the recommendations can be generated based on past user activity (e.g., provide a recommended transform that was previously used when sensitive data was identified)

Transform engine 822 can generate transform scripts based on the recommendations provided by recommendation engine 808 (e.g., a script to obfuscate the social security numbers). A transform script may perform an operation to transform data. In some embodiments, a transform script may implement a linear transformation of data. A linear transformation may be implemented through use of an API (e.g., Spark API). The transform actions may be performed by operations invoked using the API. A transform script may be configured based on transform operations defined using the API. The operations may be performed based on the recommendations.

In some embodiments, the transform engine 822 can automatically generate transform scripts to repair data at the data source. Repairs may include automatically renaming columns, replacing strings or patterns within a column, modifying text case, reformatting data, etc. For example, the transform engine 822 can generate a transformation script to transform a column of dates based on a recommendation from recommendation engine 808 to modify, or convert, the formats of the dates in the column. The recommendation may be selected from multiple recommendations to enrich or modify the data from a data source that is processed by profile engine 826. The recommendation engine 808 may determine the recommendation based on metadata, or profile, provided by the profile engine 826. The metadata may indicate a column of dates identified for different formats (e.g., MM/DD/YYYY, DD-MM-YY, etc.). The transform script generated by transform engine 822 can, for example, split and/or join columns based on suggestions from the recommendation engine 808. The transform engine 822 may also remove columns based on the data source profiles received from profile engine 826 (e.g., to remove empty columns, or columns that include information that is not desired by the user).

A transform script may be defined using a syntax that describes operations with respect to one or more algorithms (e.g., Spark Operator Trees). As such, the syntax may describe operator-tree transduction/reduction. A transform script may be generated based on a chosen recommendation or requested by a user interactively through a graphical user interface. Based on the transform operations specified by a user through the graphical user interface, the transform engine 822 performs transform operations according to those operations. The transform operations may be recommended to the user to enrich a data set.

As described further below, the client's 804 can display recommendations describing or otherwise indicating each recommended transform. When a user selects a transform script to be run, the selected transform script can be run on all or more of the data from the data source in addition to the data analyzed to determine the recommended transform(s). The resulting transformed data can then be published to one or more data targets 830 by publish engine 824. In some embodiments, the data targets can be different data stores than the data sources. In some embodiments, the data targets can be the same data stores as the data sources. Data targets 830 can include a public cloud storage service 832, a private cloud storage service 834, various other cloud services 836, a URL or web-based data target 838, or any other accessible data target.

In some embodiments, recommendation engine 808 can query knowledge service 810 for additional data related to the identified platform. For example, where the data includes a column of city names, related data (e.g., location, state, population, country, etc.) can be identified and a recommendation to enrich the dataset with the related data can be presented.

Knowledge service 810 can implement a matching method to compare the data to reference data available through knowledge service 810. Knowledge service 810 can include or have access to one or more knowledge sources 840. The knowledge sources can include publicly available information published by web sites, web services, curated knowledge stores, and other sources. Knowledge service 810 can implement a method to determine the semantic similarity between two or more datasets. This may also be used to match the user's data to reference data available through the knowledge service 810. Knowledge service 810 may perform similarity metric analysis as described in this disclosure. The techniques performed by knowledge service 810 may include those described in this disclosure including the techniques described by the references incorporated herein.

Knowledge service 810 can perform operations to implement automated data analyses. In some embodiments, knowledge service 810 can use an unsupervised machine learning tool, such as Word2Vec, to analyze an input data set. Word2Vec can receive a text input (e.g., a text corpus from a large data source) and generate a vector representation of each input word. The resulting model may then be used to identify how closely related are an arbitrary input set of words. For example, a Word2Vec model built using a large text corpus (e.g., a news aggregator, or other data source) can be utilized to determine corresponding numeric vector for each input word. When these vectors are analyzed, it may be determined that the vectors are "close" (in the Euclidean sense) within a vector space. Although this can identify that input words are related (e.g., identifying input words that are clustered closely together within a vector space), Word2Vec may not be usable to identify a descriptive label for the words (e.g., "tire manufacturers"). Knowledge service 810 may implement operations to categorize the related words using a curated knowledge source 840 (e.g., YAGO, from the Max Planck Institute for Informatics). Using information from a knowledge source 840, knowledge service 810 can add additional, related data to the input data set.

In some embodiments, knowledge service 810 may implement operations to perform trigram modeling to further refine categorization of related terms. Trigram modeling can be used to compare sets of words for category identification. The input data set can be augmented with the related terms.

Using the input data set, which may include added data, knowledge service 810 can implement matching methods (e.g., a graph matching method) to compare the words from the augmented data set to categories of data from knowledge source 840. Knowledge service 810 can implement a method to determine the semantic similarity between the augmented data set and each category in knowledge source 840 to identify a name for the category. The name of the category may be chosen based on a highest similarity metric. The similarity metric may computed be based on the number of terms in the data set that match a category name. The category may be chosen based on the highest number of terms matching based on the similarity metric. Techniques and operations performed for similarity analysis and categorization are further described below.

In some embodiments, knowledge service 810 can augment an input data set and use information from a knowledge source 840 to add additional, related data to the input data set. For example, a data analysis tool such as Word2Vec can be used to identify semantically similar words to those included in the input data set from a knowledge source, such as a text corpus from a news aggregation service. In some embodiments, knowledge service 810 can implement trigram modeling to preprocess data obtained from a knowledge source 840 (such as YAGO) to generate an indexed table of words by category. Knowledge service 810 can then create trigrams for each word in the augmented data set and match the word to a word from the indexed knowledge source 840.

Using the augmented data set (or the trigram matched augmented data set), knowledge service 810 can compare the words from the augmented data set to categories of data from knowledge source 840. For example, each category of data in the knowledge source 840 can be represented as a tree structure, with the root node representing the category, and each leaf node representing a different word belonging to that category. Knowledge service 810 can implement a method (e.g., Jaccard index, or other similarity metric) to determine the semantic similarity between the augmented data set and each category in knowledge source 810. The name of the category that matches the augmented data set (e.g., having a highest similarity metric) can then be applied as a label to the input data set.

In some embodiments, knowledge service 810 can determine the similarity of two data sets A and B, by determining the ratio of the size of the intersection of the data sets to the size of the union of the data sets. For example, a similarity metric may be computed based on the ratio of 1) the size of the intersection of an data set (e.g., an augmented data set) and a category and 2) the size of their union. The similarity metric may be computed for comparison of a data set and a category as indicated above. As such, a "best match" may be determined based on comparing the similarity metrics. The data set used for the comparison may be enriched by being augmented with a label corresponding to the category for which the best match is determined using the similarity metric.

As described above, other similarity metrics may be used in addition, or as an alternative, to the Jaccard index. One of ordinary skill in the art would recognize that any similarity metric may be used with the above described techniques. Some examples of alternative similarity metrics include, but are not limited to: the Dice-Sorensen index; the Tversky index; the Tanimoto metric; and the cosine similarity metric.

In some embodiments, knowledge service 810 may utilize a data analysis tool, such as Word2Vec, to compute a refined metric (e.g., score) that indicates a degree of match between data from a knowledge source 840 and an input data, which may be augmented with data from a knowledge source. The score ("knowledge score") may provide greater knowledge about the degree of similarity between an input data set and a category to which a comparison is made. The knowledge score may enable data enrichment service 802 to choose a category name that bests represents the input data.

In the techniques described above, knowledge service 810 may count the number of matches of terms in the input data set to a candidate category (e.g., genus) name in a knowledge source 840. The result of the comparison may yield a value that represents a whole integer. As such the value, although indicative of the degree of match between terms, may not indicate a degree of match between an input data set and different terms in a knowledge source.

Knowledge service 810 may utilize Word2Vec to determine a similarity of a comparison of each term (e.g., a term for a genus) in a knowledge source and the terms of input data (e.g., species). Using Word2Vec, knowledge service 810 can compute a similarity metric (e.g., cosine similarity or distance) between an input data set and one or more terms obtained from a knowledge source. The cosine similarity may be computed as the cosine angle between a data set of terms (e.g., a domain or genus) obtained from a knowledge source and an input data set of terms. The cosine similarity metric may be computed in a manner similar to the Tanimoto metric. By computing a similarity metric based on a cosine similarity, each term in the input data set may be considered as a faction of a whole-value integer, such as a value indicating a percentage of similarity between the term and candidate category. For example, computing a similarity metric between a tire manufacturer and a surname might result in a similarity metric of 0.3, while the similarity metric between a tire manufacturer and a company name might results in a similarity metric of be 0.4. Non-whole integer values representing similarity metrics can be close compared to provide greater accuracy for a closely matching category name. The closely matching category name may be chosen as the most applicable category name based on the similarity metric closest to a value of 1. In the example, above, based on the similarity metric, company name is more likely the correct category. As such, knowledge service 810 can associated "company" instead of "surname" with a user-supplied column of data containing tire manufactures.

Knowledge service 810 can determine information about knowledge groups (e.g., domains or categories). Information about knowledge groups can be presented in a graphical user interface. Information about knowledge domains may include a metric (e.g., a knowledge score) indicating a measure of similarity between a knowledge domain and an input data set of terms. Input data may be compared to data from a knowledge source 840. An input data set may correspond to a column of data of a data set specified by a user. The knowledge score may indicate a measure of similarity between an input data set and one or more terms provided by a knowledge source, each term corresponding to a knowledge domain. The column of data may include terms that potentially belong to knowledge domain.

In at least one embodiment, knowledge service 810 may determine a more accurate matching score. The score may correspond to a value computing using a scoring formula using techniques disclosed herein including references that are incorporated herein. The scoring formula may determine a semantic similarity between two data sets, e.g., the input data set and terms in a domain (e.g., a candidate category) obtained from a knowledge source. The domain for which the matching score indicates the best match (e.g., the highest matching score), may be chosen as the domain having the greatest similarity with the input data set. As such, the terms in the input data set may be associated with the domain name as the category.

The scoring formula may be applied to an input data set and a domain (e.g., a category of terms obtained from a knowledge source) to determine a score that indicates a measure of a match between the input data and the domain. The domain may have one or more terms, which collectively define the domain. The score may be used to determine the domain to which an input data set is most similar. The input data set may be associated with a term descriptive of the domain to which the input data set is most similar.

In some embodiments, user interface 806 can generate one or more graphical visualizations based on metadata provided by profile engine 826. As explained above, the data provided by profile engine 826 may include statistical information indicating metrics about data that has been processed by profile engine 826. A graphical visualization can include a graphical dashboard (e.g., a visualization dashboard). The graphical dashboard may indicate a plurality of metrics, each of the plurality of metrics indicating a real time metric of the data relative to a time that the data is profiled. A graphical visualization may be displayed in a user interface. For example, the graphical visualization that is generated may be sent to a client device to cause the client device to display the graphical visualization in a user interface at the client device. In some embodiments, a graphical visualization may provide profiling results.

Additionally, the structural analyses by the profile engine 826 enable the recommendation engine to better focus its queries to knowledge service 810, improving processing speed and reducing load on system resources. For example, this information can be used to limit the scope of knowledge being queried so that the knowledge service 810 does not attempt to match a column of numerical data to place names.

Semantic analysis engine 844 can process and analyze an input data set. The input data set may be based on a text corpus from a large data source. The input dataset may be obtained from multiple data sources. The datasets may be processed as ingested from data sources, and/or may be processed after processing performed by any elements of data enrichment service 802. Semantic analysis engine 844 may include one or more components to perform processing on a dataset from a data source to determine semantic analysis using techniques disclosed herein. The results of semantic analysis may be visualized using techniques disclosed herein.

In an example embodiment, data enrichment service 810 can include a toponym disambiguation system 900 that is configured to perform toponym disambiguation, in accordance with some example embodiments. Toponym disambiguation system 900 is explained in more detail with respect to FIG. 9.

Toponym Disambiguation System

FIG. 9 illustrates a simplified block diagram of a toponym disambiguation system 900, in accordance with some example embodiments. The toponym disambiguation system 900 can include subset creator 910, set initializer 920, pairing services 930, updater 940, score calculator 950, output device 960, and data store 970. The toponym disambiguation system 900 can be a component of a data enrichment system or it can be separate from a data enrichment system.

Subset creator 910 can be configured to create the subset $R_X$ which includes a list of cities. Subset creator 910 can perform step 110 of FIG. 1. Set generator 920 can be configured to initialize set C. Set generator 920 can perform step 120 of FIG. 1. Pairing services 930 can be configured to identify possible city and province pairings. Pairing services 930 can perform step 130 of FIG. 1. Updater 940 can update the subset $R_X$ and the set C. Updater 940 can be configured to perform step 140 of FIG. 1. Score calculator 950 can be a processor that is configured to calculate a confidence score. Score calculator 950 can perform step 150 of FIG. 1. Output device 960 can be configured to output the results in the data set C, the subset $R_X$, or the reference list of cities R. Output device 960 can include a display, such as an interactive user display. Data store 970 can store the reference list of cities R, the subset $R_X$, and the data set C. Data store 970 can also store the scores for the city and province pairings. The elements shown in FIG. 9 are examples and the elements can be combined and/or separated into other elements.

Computer System

Figure 10:
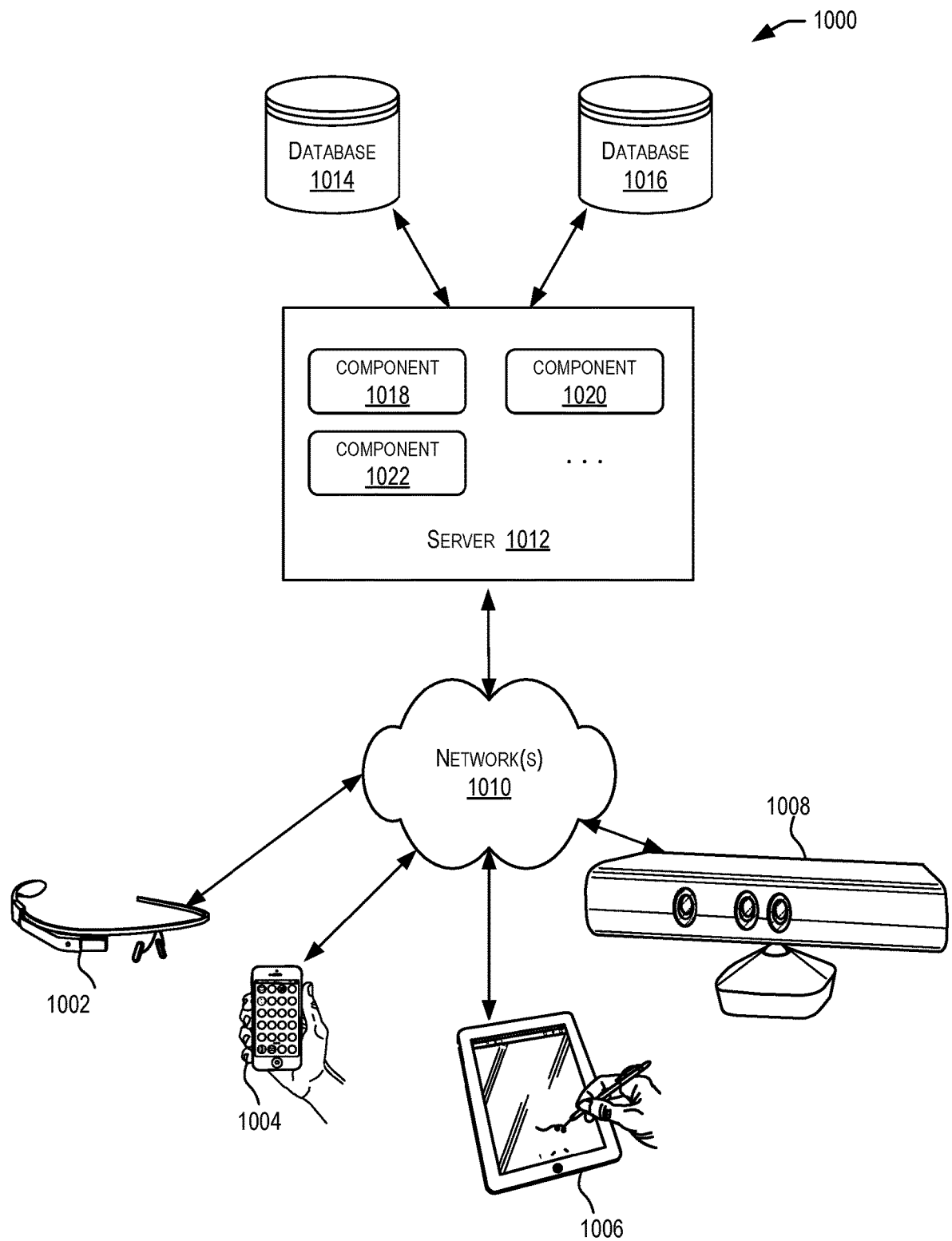
FIG. 10 illustrates a simplified diagram of a distributed system for implementing some example embodiments.
Figure 11:
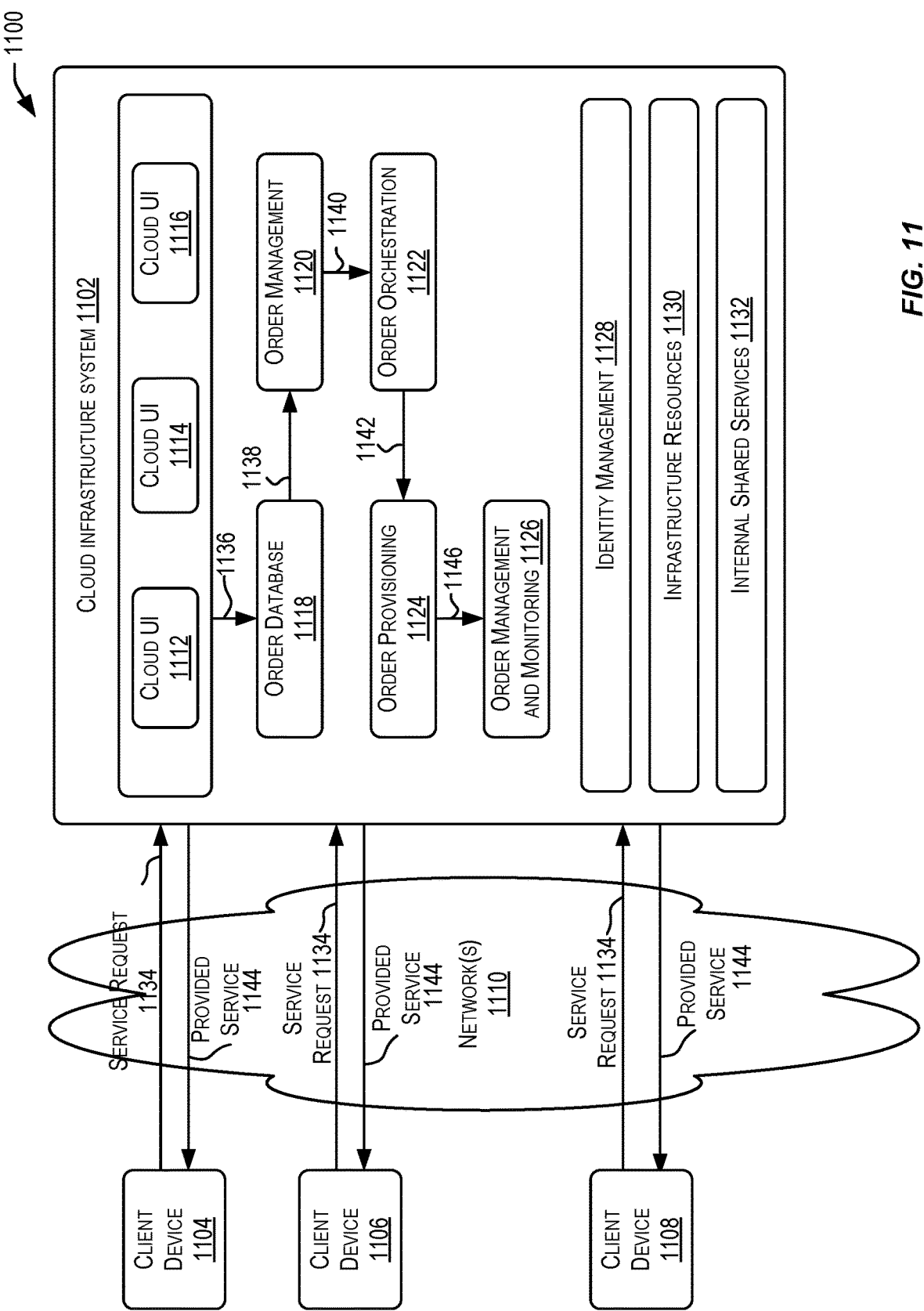
FIG. 11 illustrates a simplified block diagram of one or more components of a system environment in which services may be offered as cloud services, in accordance with some example embodiments.
Figure 12:
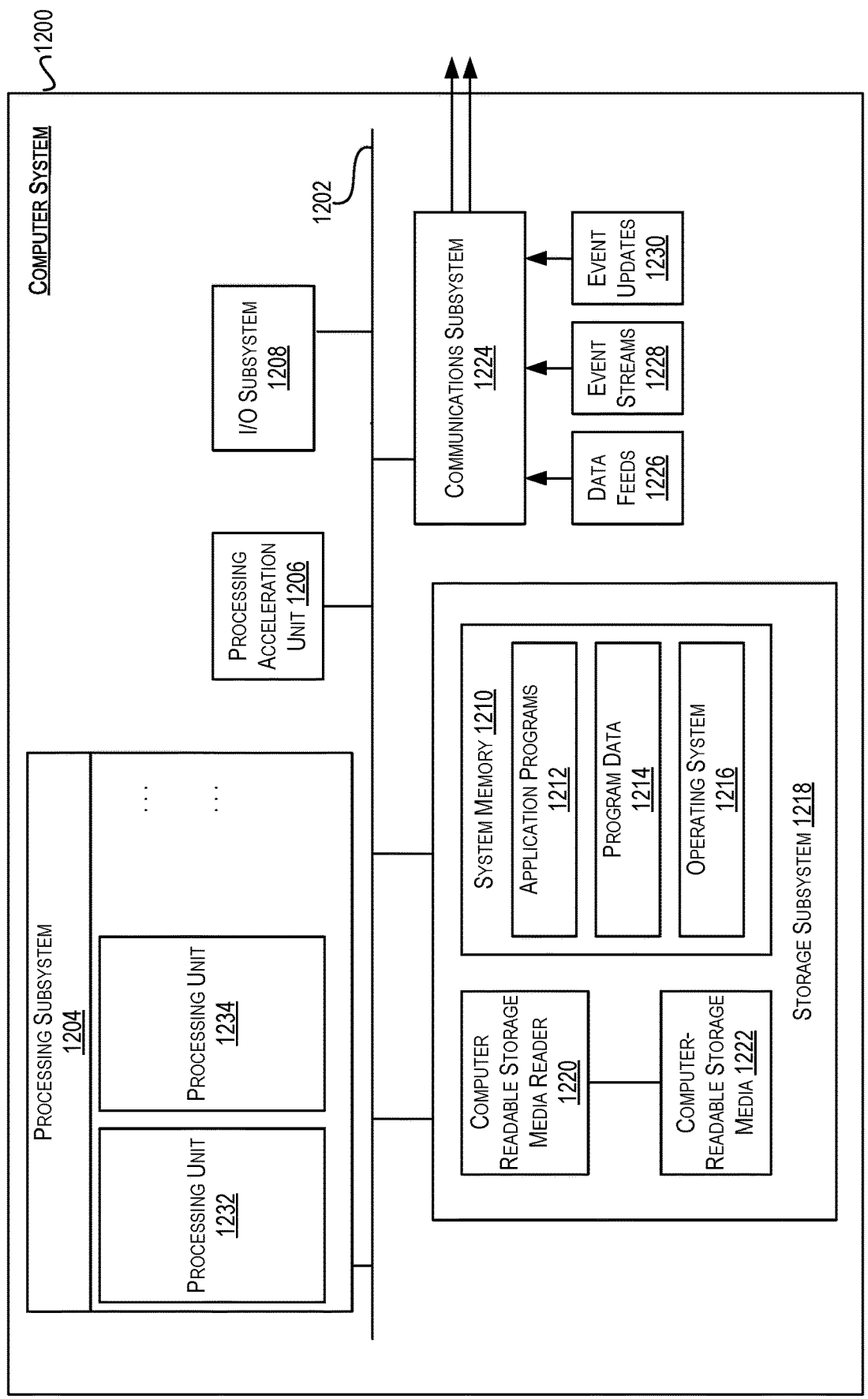
FIG. 12 illustrates an exemplary computer system that may be used to implement certain components, in accordance with some example embodiments.

FIGS. 10, 11 and 12 illustrate exemplary hardware and/or software configurations used in various embodiments.

FIG. 10 illustrates a simplified diagram of a distributed system for implementing some example embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications such as services and applications that provide code and/or data for performing efficient application configuration patching for applications executing at the server 1012 or another server. In certain embodiments, server 1012 may also provide other services or software applications that can include non-virtual and virtual environments. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, software components 1018, 1020 and 1022 of system 1000 are shown as being implemented on server 1012. As one example, one or more of the components (e.g., software component 1018) may be the configuration patch module or binary patch module discussed throughout the application.

In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in FIG. 10 is thus one example of a distributed system for implementing an embodiment system and is not intended to be limiting.

Client computing devices 1002, 1004, 1006, and/or 1008 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1010.

Although distributed system 1000 in FIG. 10 is shown with four client computing devices, any number of client computing devices may be supported. Other devices, such as devices with sensors, etc., may interact with server 1012.

Communication network(s) 1010 in distributed system 1000 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red (IR) network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization. One or more flexible pools of logical storage devices can be virtualized to maintain virtual storage devices for the server. Virtual networks can be controlled by server 1012 using software defined networking. In various embodiments, server 1012 may be adapted to run one or more services or software applications described in the foregoing disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Distributed system 1000 may also include one or more databases 1014 and 1016. These databases may provide a mechanism for storing information such as user interactions information, usage patterns information, adaptation rules information, and other information used by example embodiments. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands. However, databases 1014 and 1016 may provide relational databases, object-oriented databases, object-relational databases, NoSQL databases, etc., and may or may not be SQL-based. For example, databases 1014 and/or 1016 may be Oracle Database, PostgreSQL, Microsoft SQL Server, MySQL, MemSQL, Memcached, Redis, MongoDB, BigTable, Cassandra, DB2, Solr, etc.

In some embodiments, code and/or data for performing efficient application configuration patching may be offered as services via a cloud environment. FIG. 11 is a simplified block diagram of one or more components of a system environment 1100 in which services may be offered as cloud services, in accordance with some embodiments of the present disclosure. In the illustrated embodiment in FIG. 11, system environment 1100 includes one or more client computing devices 1104, 11011, and 1108 that may be used by users to interact with a cloud infrastructure system 1102 that provides cloud services. Additionally, in some embodiments the "client" computing devices 1104, 11011, 1108 may actually be server computers acting as a client in a client-server relationship, where the server may provide application configuration patching services. Cloud infrastructure system 1102 may comprise one or more computers and/or servers that may include those described above for server 1012.

It should be appreciated that cloud infrastructure system 1102 depicted in FIG. 11 may have other components than those depicted. Further, the embodiment shown in FIG. 11 is one example of a cloud infrastructure system that may incorporate an example embodiment. In some other embodiments, cloud infrastructure system 1102 may have more or fewer components than shown in the figure, may combine two or more components, or may have a different configuration or arrangement of components.

Client computing devices 1104, 11011, and 1108 may be devices similar to those described above for 1002, 1004, 1006, and 1008. Client computing devices 1104, 1106, and 1108 may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102. Although exemplary system environment 1100 is shown with three client computing devices, any number of client computing devices may be supported. Other devices such as devices with sensors, etc. may interact with cloud infrastructure system 1102.

Communication network(s) 1010 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for communication network(s) 1010.

In certain embodiments, services provided by cloud infrastructure system 1102 may include a host of services that are made available to users of the cloud infrastructure system on demand. In addition to services related to providing code and/or data for performing efficient application configuration patching operations, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1102 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1102 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle Corporation) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1102 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1102 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database-as-a-Service (DaaS) in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform, and other resources.

In some embodiments, resources in cloud infrastructure system 1102 may be shared by multiple users and dynamically re-allocated per demand. Additionally, resources may be allocated to users in different time zones. For example, cloud infrastructure system 1102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 to enable provisioning of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 1102, and the like.

In one embodiment, as depicted in FIG. 11, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In an exemplary operation, at 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI) such as cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

At 1136, the order information received from the customer may be stored in an order database 1118. If this is a new order, a new record may be created for the order. In one embodiment, order database 1118 can be one of several databases operated by cloud infrastructure system 1118 and operated in conjunction with other system elements.

At 1138, the order information may be forwarded to an order management module 1120 that may be configured to perform billing and accounting functions related to the order, such as verifying the order, and upon verification, booking the order.

At 1140, information regarding the order may be communicated to an order orchestration module 1122 that is configured to orchestrate the provisioning of services and resources for the order placed by the customer. In some instances, order orchestration module 1122 may use the services of order provisioning module 1124 for the provisioning. In certain embodiments, order orchestration module 1122 enables the management of business processes associated with each order and applies business logic to determine whether an order should proceed to provisioning.

As shown in the embodiment depicted in FIG. 11, at 1142, upon receiving an order for a new subscription, order orchestration module 1122 sends a request to order provisioning module 1124 to allocate resources and configure resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. This enables order orchestration module 1122 to be isolated from implementation details, such as whether or not services and resources are actually provisioned on the fly or pre-provisioned and allocated/assigned upon request.

At 1144, once the services and resources are provisioned, a notification may be sent to the subscribing customers indicating that the requested service is now ready for use. In some instance, information (e.g. a link) may be sent to the customer that enables the customer to start using the requested services.

At 1146, a customer's subscription order may be managed and tracked by an order management and monitoring module 1126. In some instances, order management and monitoring module 1126 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1100 may include an identity management module 1128 that is configured to provide identity services, such as access management and authorization services in cloud infrastructure system 900. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

FIG. 12 illustrates an exemplary computer system 1200 that may be used to implement certain components according to some example embodiments. In some embodiments, computer system 1200 may be used to implement any of the various servers and computer systems described above. As shown in FIG. 12, computer system 1200 includes various subsystems including a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 may include tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processing units 1232, 1234, etc. A processing unit may include be one or more processors, including single core or multicore processors, one or more cores of processors, or combinations thereof. In some embodiments, processing subsystem 1204 can include one or more special purpose co-processors such as graphics processors (GPUs), digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1222 including potentially on one or more storage devices. Through suitable programming, processing subsystem 1204 can provide various functionalities described above for performing efficient application configuration patching operations.

In certain embodiments, a processing acceleration unit 1206 may be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term "input device" is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information that is used by computer system 1200. Storage subsystem 1218 provides a tangible non-transitory computer-readable storage medium for storing the basic programming and data constructs that provide the functionality of some embodiments. Software (programs, code modules, instructions) that when executed by processing subsystem 1204 provide the functionality described above may be stored in storage subsystem 1218. The software may be executed by one or more processing units of processing subsystem 1204. Storage subsystem 1218 may also provide a repository for storing data used in accordance with the some example embodiments.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM) or dynamic random access memory (DRAM).

By way of example, and not limitation, as depicted in FIG. 12, system memory 1210 may store application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1222 may store programming and data constructs that provide the functionality of some embodiments. Software (programs, code modules, instructions) that when executed by processing subsystem 1204 a processor provide the functionality described above may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1222 may provide storage of computer-readable instructions, data structures, program modules, and other data for computer system 1200.

In certain embodiments, storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for storing computer-readable information.

In certain embodiments, computer system 1200 may provide support for executing one or more virtual machines. Computer system 1200 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1200. Accordingly, multiple operating systems may potentially be run concurrently by computer system 1200. Each virtual machine generally runs independently of the other virtual machines.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, communications subsystem 1224 may receive input communication in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Although specific example embodiments have been described, various modifications, alterations, alternative constructions, and equivalents are also encompassed within the scope of the example embodiments. The example embodiments are not restricted to operation within certain specific data processing environments, but are free to operate within a plurality of data processing environments. Additionally, although example embodiments have been described using a particular series of transactions and steps, it should be apparent to those skilled in the art that the scope of the example embodiments are not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. The example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

What is claimed is:

1. A method for performing toponym disambiguation, the method comprising:
   receiving, by a processor, a set of geographic location data;
   initializing, by the processor, a data set configured to store disambiguated geographic location data and storing the data set in a memory;
   determining, by the processor, a first subset of geographic location data from the set of geographic location data having a disambiguated place name;
   loading, by the processor, the determined first subset of geographic location data having the disambiguated place name into the data set;
   removing, by the processor, the determined first subset of geographic location data from the set of geographic location data to generate an updated set of geographic location data;
   calculating, by the processor, a score for the set of geographic location data in the updated set of geographic location data, wherein the score indicates a degree of confidence regarding a place name for the set of geographic location data; and
   providing, by the processor, the scored geographic location data.

2. The method according to claim 1, wherein the set of geographic location data comprises a city name and one or more additional information associated with the city name.

3. The method according to claim 2, wherein the one or more additional information comprises a name of a province, a name of a state, or a name of a country associated with the city name in the set of geographic location data.

4. The method according to claim 1, wherein in response to calculating the score for the set of geographic location data, for each city name in the set of geographic location data, determining a highest scoring pairing of a city name and a province in the set of geographic location data; and
   loading the determined highest scoring pairing of the city name and the province from the set of geographic location data into the data set.

5. The method according to claim 2, wherein the one or more additional information comprises a name of a geographic location in which a city associated with the city name is located.

6. The method according to claim 1, wherein the set of geographic location data comprises one or more city names corresponding to one or more city names in a geographical database.

7. The method according to claim 1, wherein the score is calculated for each city and province pair in the set of geographic location data.

8. The method according to claim 1, wherein the score for the set of geographic location data is calculated based on population data, distance data, country data, spelling data, and matching data.

9. The method according to claim 1, wherein the received geographic location data comprises a column of data from a spreadsheet.

10. The method according to claim 1, wherein initializing the data set comprises generating an empty data set for storing disambiguated geographic locations.

11. The method according to claim 1, wherein the first subset of geographic location data is unambiguous geographic location data from the received geographic location data.

12. The method according to claim 11, wherein the unambiguous geographic location data from the received geographic location data comprises a city name associated with only one province.

13. A computing device for performing toponym disambiguation comprising:
    a memory; and
    one or more processors configured to:
       receive a set of geographic location data;
       initialize a data set configured to store disambiguated geographic location data and storing the data set in the memory;
       determine a first subset of geographic location data from the set of geographic location data having a disambiguated place name;
       load the determined first subset of geographic location data having the disambiguated place name into the data set;
       remove the determined first subset of geographic location data from the set of geographic location data to generate an updated set of geographic location data;
       calculate a score for the set of geographic location data in the updated set of geographic location data, wherein the score indicates a degree of confidence regarding a place name for the set of geographic location data; and
       provide the scored geographic location data.

14. The computing device according to claim 13, wherein the set of geographic location data comprises a city name and one or more additional information associated with the city name.

15. The computing device according to claim 14, wherein the one or more additional information comprises a name of a province, a name of a state, or a name of a country associated with the city name in the set of geographic location data.

16. The computing device according to claim 13, wherein in response to calculating the score for the set of geographic location data, for each city name in the set of geographic location data, determining a highest scoring pairing of a city name and a province in the set of geographic location data; and
    loading the determined highest scoring pairing of the city name and the province from the set of geographic location data into the data set.

17. A non-transitory computer readable storage medium storing instructions which, when executed by one or more processors of a computing device, cause the one or more processors to perform a method comprising:

receiving a set of geographic location data;

initializing a data set configured to store disambiguated geographic location data and storing the data set in a memory;

determining a first subset of geographic location data from the set of geographic location data having a disambiguated place name;

loading the determined first subset of geographic location data having the disambiguated place name into the data set;

removing the determined first subset of geographic location data from the set of geographic location data to generate an updated set of geographic location data;

calculating a score for the set of geographic location data in the updated set of geographic location data, wherein the score indicates a degree of confidence regarding a place name for the set of geographic location data; and providing the scored geographic location data.

18. The computer readable storage medium according to claim 17, wherein the set of geographic location data comprises a city name and one or more additional information associated with the city name.

19. The computer readable storage medium according to claim 18, wherein the one or more additional information comprises a name of a province, a name of a state, or a name of a country associated with the city name in the set of geographic location data.

20. The computer readable storage medium according to claim 17, wherein in response to calculating the score for the set of geographic location data, for each city name in the set of geographic location data, determining a highest scoring pairing of a city name and a province in the set of geographic location data; and loading the determined highest scoring pairing of the city name and the province from the set of geographic location data into the data set.

* * * * *

UNITED STATES PATENT AND TRADEMARK OFFICE
CERTIFICATE OF CORRECTION

| | | Page 1 of 1 |
|---|---|---|
| PATENT NO. | : 11,120,086 B2 | |
| APPLICATION NO. | : 16/272831 | |
| DATED | : September 14, 2021 | |
| INVENTOR(S) | : Rivas et al. | |

It is certified that error appears in the above-identified patent and that said Letters Patent is hereby corrected as shown below:

On the Title Page

Column 1, under (73) Assignee, Line 2, delete "Redwood Shore" and insert -- Redwood Shores --, therefor.

Column 1, under Abstract, Line 3, delete "placenames." and insert -- place names. --, therefor.

In the Specification

In Column 1, Line 64, delete "placenames." and insert -- place names. --, therefor.

In Column 1, Line 64, delete "placename" and insert -- place name --, therefor.

In Column 9, Line 33, delete "the a" and insert -- the --, therefor.

In Column 9, Line 44, delete "can be can be" and insert -- can be --, therefor.

In Column 14, Line 33, delete "that that" and insert -- that --, therefor.

In Column 18, Lines 57-58, delete "hexidecimal" and insert -- hexadecimal --, therefor.

In Column 22, Line 21, delete "identified)" and insert -- identified). --, therefor.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*